US012447740B2

(12) United States Patent
Kiyokawa et al.

(10) Patent No.: US 12,447,740 B2
(45) Date of Patent: Oct. 21, 2025

(54) EJECTION APPARATUS AND EJECTION SPEED CALCULATION METHOD

(71) Applicant: CANON KABUSHIKI KAISHA, Tokyo (JP)

(72) Inventors: Yusuke Kiyokawa, Tokyo (JP); Masashi Negishi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/506,907

(22) Filed: Nov. 10, 2023

(65) Prior Publication Data

US 2024/0075737 A1 Mar. 7, 2024

Related U.S. Application Data

(63) Continuation of application No. 17/322,581, filed on May 17, 2021, now Pat. No. 11,840,077.

(30) Foreign Application Priority Data

May 19, 2020 (JP) ................................ 2020-087709
May 20, 2020 (JP) ................................ 2020-088056

(51) Int. Cl.
*B41J 2/045* (2006.01)
*B41J 19/14* (2006.01)
*B41J 25/308* (2006.01)

(52) U.S. Cl.
CPC ....... *B41J 2/04561* (2013.01); *B41J 2/04558* (2013.01); *B41J 2/04586* (2013.01); *B41J 19/145* (2013.01); *B41J 25/3088* (2013.01)

(58) Field of Classification Search
CPC ...................................................... B41J 2/0451
See application file for complete search history.

(56) References Cited

U.S. PATENT DOCUMENTS 5,988,784 A * 11/1999 Takemura .............. B41J 2/1752 347/14
2003/0071984 A1* 4/2003 Teramae .................. B41J 2/125 356/28

FOREIGN PATENT DOCUMENTS

JP 2002337328 A 11/2002
JP 2003035719 A 2/2003
(Continued)

OTHER PUBLICATIONS

Machine generated English translation of JP2003276171A to Konno, "Device for Detecting Ejection of Liquid Drop"; retrieved via espacenet.com on Dec. 19, 2024; 5pp.*

*Primary Examiner* — Shelby L Fidler
(74) *Attorney, Agent, or Firm* — Canon U.S.A., Inc., IP Division

(57) ABSTRACT

In a state where a distance from an ejection port surface of an ejection head to a predetermined position corresponds to a first distance, a period detection unit detects a first period from when ejection of a droplet from an ejection port is started until when a droplet detection unit detects the droplet, and in a state where the distance from the ejection port surface of the ejection head to the predetermined position is changed to a second distance by a change unit, the period detection unit detects a second period from when ejection of a droplet from the ejection port is started until when the droplet detection unit detects the droplet, the second distance being different from the first distance. A calculation unit calculates an ejection speed of the droplet, based on the first distance, the second distance, the first period, and the second period.

23 Claims, 16 Drawing Sheets

(56) References Cited

FOREIGN PATENT DOCUMENTS

| | | | | |
|---|---|---|---|---|
| JP | 2003276171 | A | * | 9/2003 |
| JP | 2004181695 | A | | 7/2004 |
| JP | 2005081714 | A | | 3/2005 |
| JP | 2009083261 | A | | 4/2009 |
| JP | 2009119751 | A | | 6/2009 |
| JP | 2011104776 | A | | 6/2011 |
| JP | 2014061599 | A | | 4/2014 |

* cited by examiner

EJECTION APPARATUS AND EJECTION SPEED CALCULATION METHOD

CROSS-REFERENCE TO RELATED APPLICATIONS

The present application is a continuation of U.S. patent application Ser. No. 17/322,581, filed on May 17, 2021, which claims priority from Japanese Patent Applications No. 2020-087709, filed May 19, 2020, and No. 2020-088056, filed May 20, 2020, which are hereby incorporated by reference herein in their entirety.

BACKGROUND OF THE INVENTION

Field of the Invention

The present invention relates to an ejection apparatus and an ejection speed calculation method.

Description of the Related Art

In inkjet printing apparatuses, ejection speeds of ink droplets can change depending on individual differences of printing apparatuses and printheads, physical properties of ink, and the use status and environmental impacts after a long use. If ejection speeds of ink droplets change, a landing position of an ink droplet ejected in a forward direction and a landing position of an ink droplet ejected in a backward direction are misaligned, for example, when an image is printed by reciprocating scanning of a printhead. This causes deterioration in image quality.

Japanese Patent Application Laid-Open No. 2007-152853 discusses a registration adjustment method in which an optical detector for measuring an ejection speed of ejected ink is provided and an appropriate ejection timing is set in accordance with a movement speed and an ejection speed of a printhead, based on the measurement result. Japanese Patent Application Laid-Open No. 2007-152853 also discusses an ink ejection speed measurement method for measuring a period from when ink is ejected until when the ink reaches a light beam irradiated from the optical detector and calculating an ejection speed based on the measurement result and a distance from the printhead to the light beam.

However, in the method of calculating an ejection speed under a setting where a distance between an ejection head and a droplet detection sensor is fixed as discussed in Japanese Patent Application Laid-Open No. 2007-152853, if an error occurs in the distance between the ejection head and the droplet detection sensor, an ejection speed cannot be calculated with high accuracy.

The present invention has been made in view of the above-described issue, and is directed to improving accuracy of calculating an ejection speed of an ink droplet.

SUMMARY OF THE INVENTION

According to an aspect of the present invention, an ejection apparatus includes an ejection head configured to eject a droplet from an ejection port formed on an ejection port surface, a droplet detection unit configured to detect that the ejected droplet has reached a predetermined position, a period detection unit configured to detect a period from when the ejection head starts ejection of the droplet until when the droplet detection unit detects that the droplet has reached the predetermined position, a calculation unit configured to calculate an ejection speed of the droplet, based on the period detected by the period detection unit and a distance from the ejection port surface to the predetermined position, and a change unit configured to change a distance between the ejection port surface of the ejection head and the droplet detection unit, wherein in a state where the distance from the ejection port surface of the ejection head to the predetermined position corresponds to a first distance, the period detection unit detects a first period from when ejection of a droplet from the ejection port is started until when the droplet detection unit detects the droplet, and in a state where the distance from the ejection port surface of the ejection head to the predetermined position is changed to a second distance by the change unit, the period detection unit detects a second period from when ejection of a droplet from the ejection port is started until when the droplet detection unit detects the droplet, the second distance being different from the first distance, and wherein the calculation unit calculates an ejection speed of the droplet, based on the first distance, the second distance, the first period, and the second period.

Further features of the present invention will become apparent from the following description of exemplary embodiments with reference to the attached drawings.

DESCRIPTION OF THE EMBODIMENTS

<Outline of Overall Configuration of Printing Apparatus>

Figure 1:
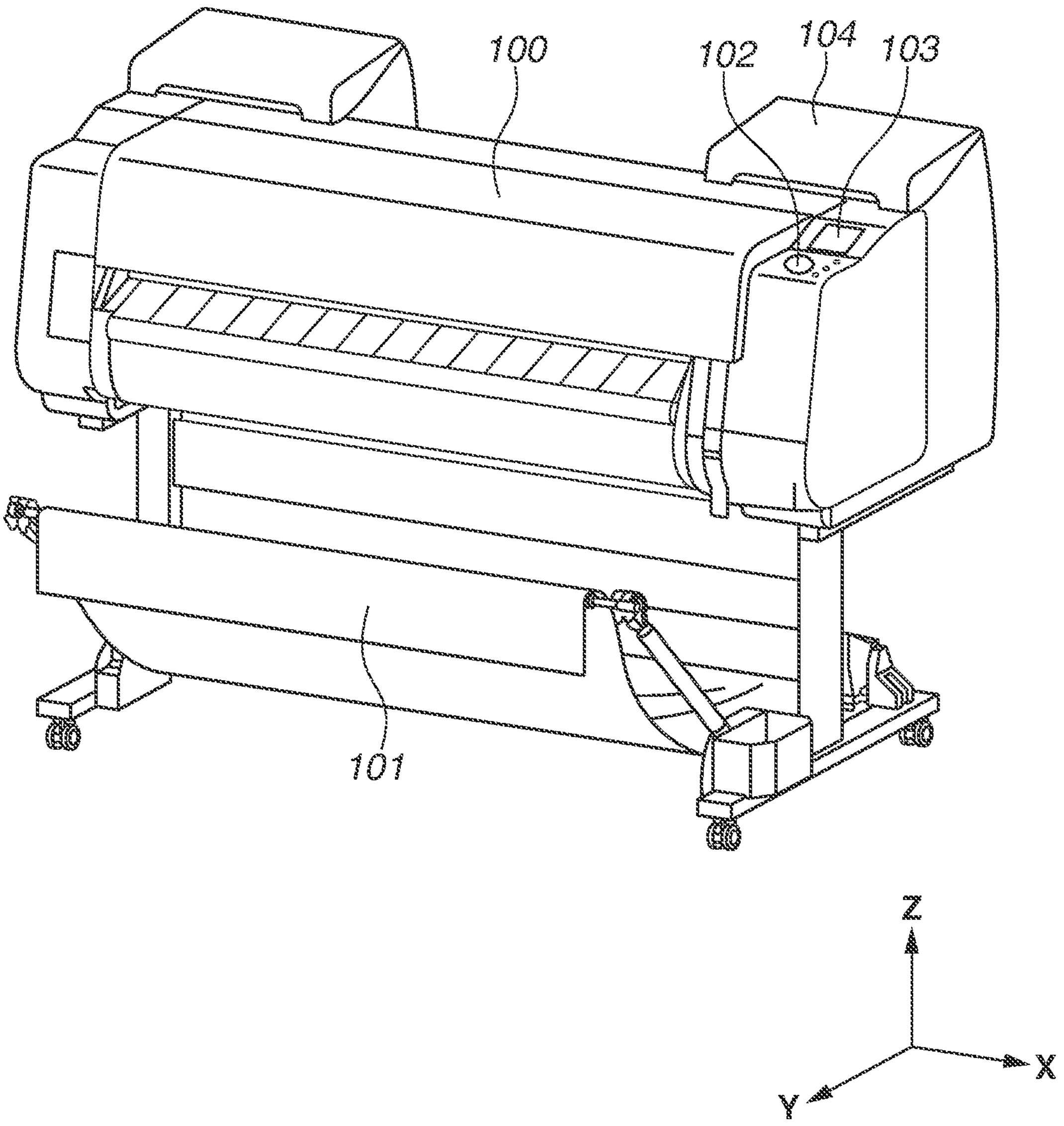
FIG. 1 is a view illustrating an appearance of a printing apparatus according to a first exemplary embodiment.

FIG. 1 is a view illustrating an appearance of an inkjet printing apparatus (hereinafter referred to as a printing apparatus) 100 as an example of a droplet ejection apparatus according to a first exemplary embodiment.

The printing apparatus 100 illustrated in FIG. 1 includes a discharge guide 101 on which an output recording medium is stacked, a display panel 103 for displaying various printing information, setting results, and the like, and an operation button 102 for setting a printing mode, a recording sheet, and the like. The printing apparatus 100 further includes an ink tank unit 104 that accommodates ink tanks for storing ink of colors, such as black, cyan, magenta, and yellow, and supplies ink to a printhead 201 (FIG. 2) which is an example of a droplet ejection head. The printing apparatus 100 illustrated in FIG. 1 is a printing apparatus capable of printing images on recording media with various widths up to a 60-inch recording medium. Roll paper and cut paper can be used as a recording medium 203. The recording medium 203 is not limited to paper, but instead may be, for example, cloth or plastic.

Figure 2:
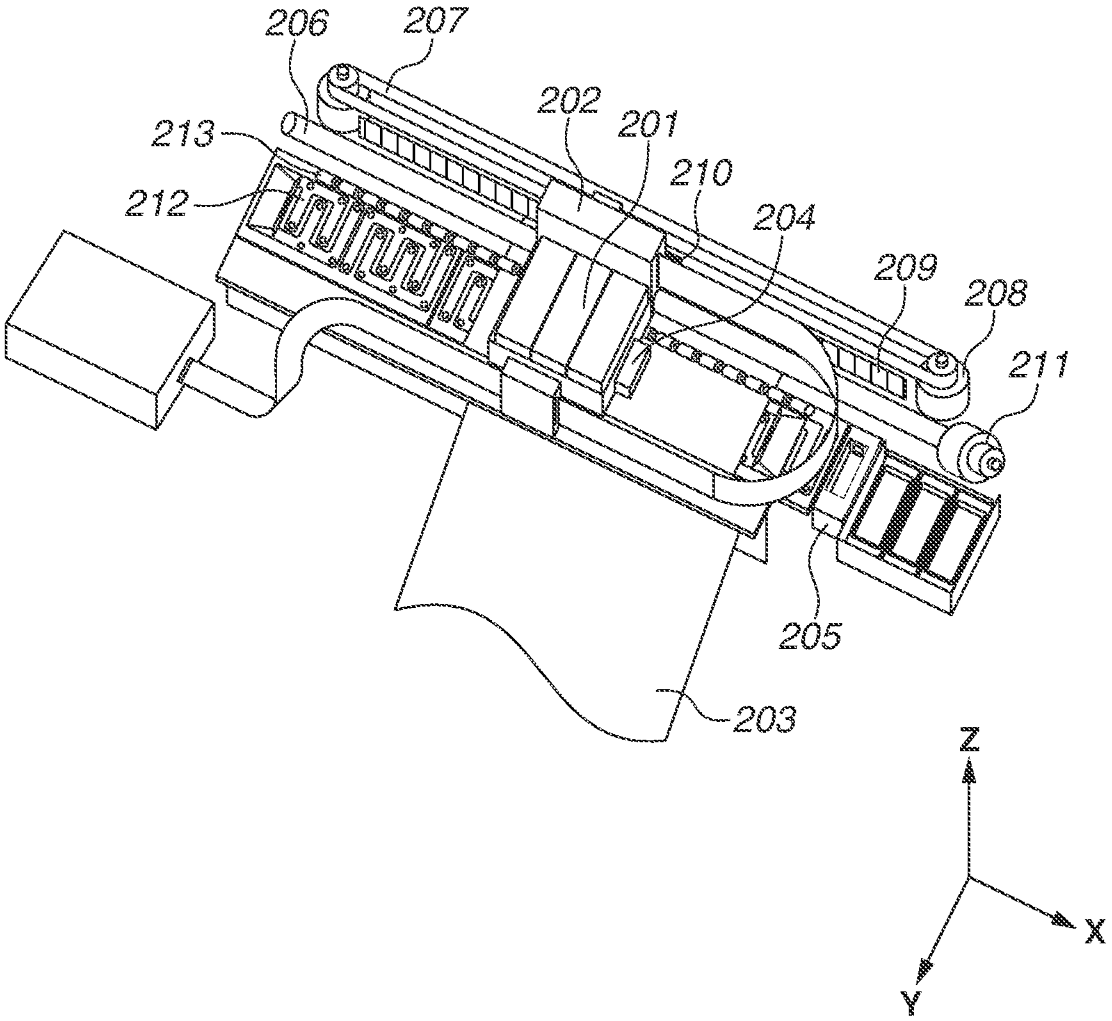
FIG. 2 is a perspective view illustrating an internal configuration of the printing apparatus according to the first exemplary embodiment.
Figure 5A:
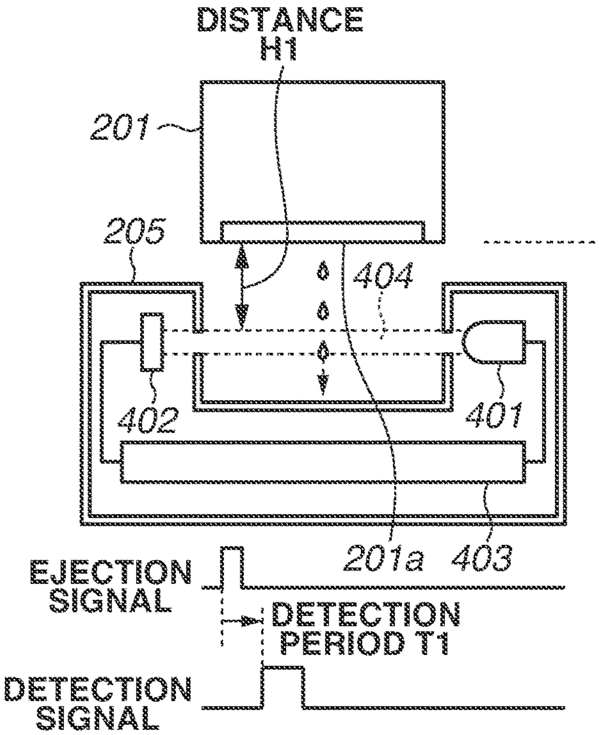
FIGS. 5A, 5B, 5C, and 5D are diagrams illustrating an ink droplet ejection speed calculation method according to the first exemplary embodiment.

FIG. 2 is a perspective view illustrating an internal configuration of the printing apparatus 100. A platen 212 is a member for supporting the recording medium 203 located at a position facing the printhead 201. The recording medium 203 is supported by the platen 212 and conveyed in a conveyance direction (Y-direction) by a sheet conveyance roller 213. The printhead 201 includes an ejection port surface 201*a* (FIG. 5A) on which an ejection port is formed. On the ejection port surface 201*a*, an ejection port row in which a plurality of ejection ports is arranged in the Y-direction for each ink color, and the ejection port rows are arranged in an X-direction. The printhead 201 is mounted on a carriage 202. The printhead 201 also includes a distance detection sensor 204 for detecting a distance between the printhead 201 and the recording medium 203 on the platen 212. The distance detection sensor 204 includes a light-emitting element (FIG. 8A) that irradiates the recording medium 203 with light, and a light-receiving element (FIG. 8A) that receives light reflected from the recording medium 203. The distance detection sensor 204 is an optical sensor for measuring a distance based on a change in output of an amount of light received by the light-receiving element. This configuration will be described in detail with reference to FIGS. 8A and 8B. A droplet detection sensor 205 is a sensor for detecting a droplet ejected from the printhead 201. In the present exemplary embodiment, the droplet detection sensor 205 is a sensor for detecting an ink droplet. The droplet detection sensor 205 is an optical sensor including a light-emitting element 401 (FIG. 5A), a light-receiving element 402 (FIG. 5A), and a control circuit board 403 (FIG. 5A). This configuration will be described in detail with reference to FIGS. 5A to 5D. A main rail 206 supports the carriage 202 and the carriage 202 performs reciprocating scanning in the X-direction (direction orthogonal to the recording medium conveyance direction) along the main rail 206. The carriage 202 performs scanning when a carriage conveyance belt 207 is driven by driving of a carriage motor 208. A linear scale 209 is disposed in a scanning direction and an encoder sensor 210 mounted on the carriage 202 detects the linear scale 209 to acquire positional information. The printing apparatus 100 further includes a lift cam (not illustrated) for causing the height of the main rail 206 supporting the carriage 202 to be varied in stages, and a lift motor 211 for driving the lift cam. The lift motor 211 drives the lift cam to cause the printhead 201 to ascend or descend and thus to cause the printhead 201 and the recording medium 203 to approach each other or to be spaced apart from each other. The height of the main rail 206 can be varied in multiple stages with a predetermined accuracy based on a position where the lift cam is stopped, and the variable amount of the height is changed relatively to a height corresponding to a predetermined stage. Thus, the variable distance between stages can be set with high accuracy.

Figure 3:
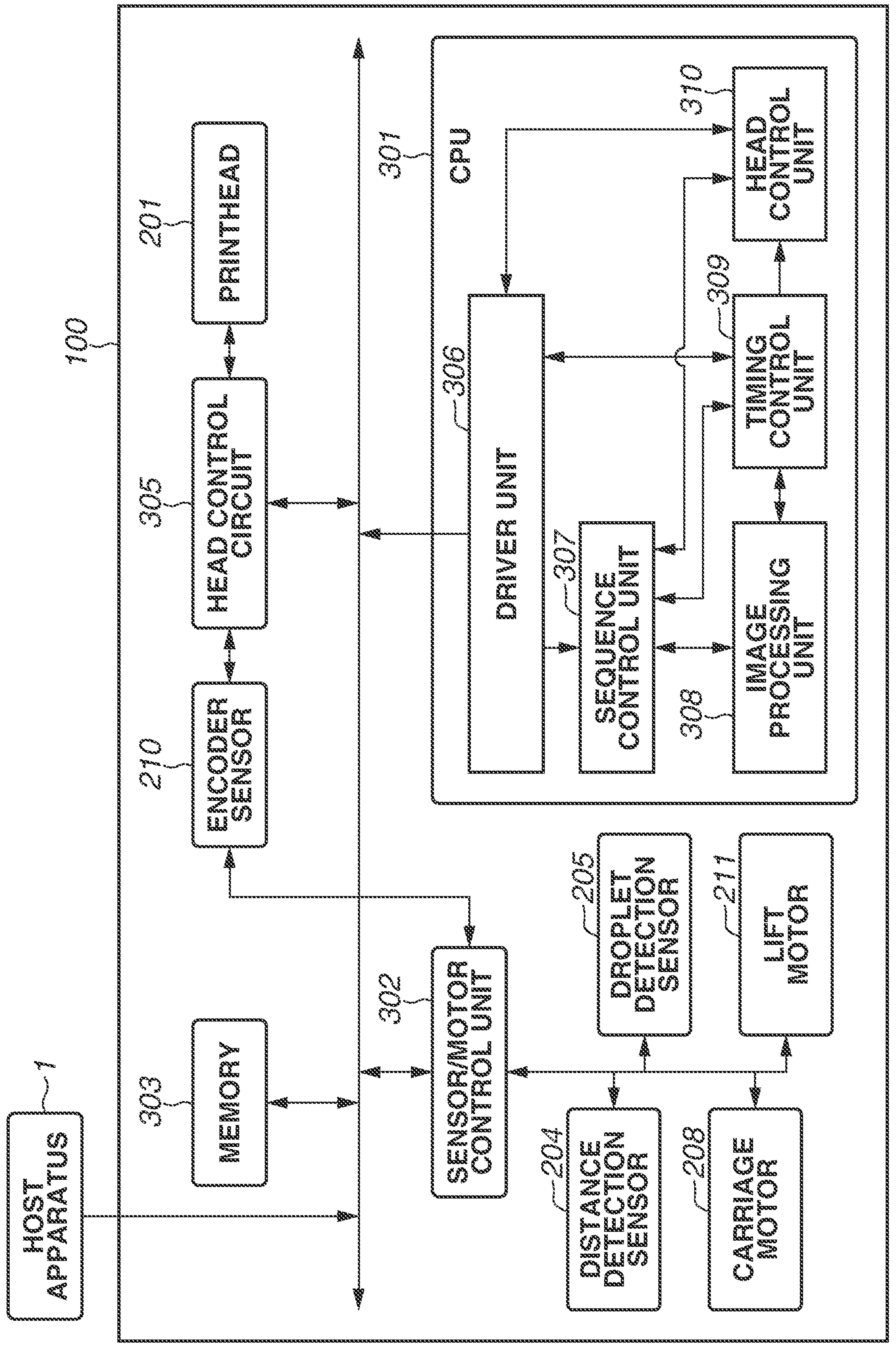
FIG. 3 is a block diagram illustrating a control configuration of the printing apparatus according to the first exemplary embodiment.

FIG. 3 is a block diagram illustrating a control configuration of the printing apparatus 100. The printing apparatus 100 includes a central processing unit (CPU) 301 that controls the overall operation of the printing apparatus 100, a sensor/motor control unit 302 that controls sensors and motors, and a memory 303 that stores various information about an ejection speed and a thickness of each recording medium 203. The CPU 301, the sensor/motor control unit 302, and the memory 303 are connected to each other to communicate with each other. The sensor/motor control unit 302 controls the distance detection sensor 204, the droplet detection sensor 205, and the carriage motor 208 for scanning the carriage 202. The sensor/motor control unit 302 controls a head control circuit 305 based on the positional information detected by the encoder sensor 210, and causes the printhead 201 to eject ink.

Image data transmitted from a host apparatus 1 is converted into an ejection signal by the CPU 301, and ink is ejected from the printhead 201 according to the ejection signal, to perform printing on the recording medium 203. The CPU 301 includes a driver unit 306, a sequence control unit 307, an image processing unit 308, a timing control unit 309, and a head control unit 310. The sequence control unit 307 controls the overall printing control operation. Specifically, for example, the sequence control unit 307 controls the functional blocks, including the image processing unit 308, the timing control unit 309, and the head control unit 310, to be started and stopped, controls the conveyance of the recording medium 203, and controls scanning by the carriage 202. The functional blocks are controlled such that the sequence control unit 307 reads out various programs from the memory 303 and executes the programs. The driver unit 306 generates a control signal that is transmitted to the sensor/motor control unit 302, the memory 303, the head control circuit 305, and the like, based on an instruction from the sequence control unit 307, and transmits an input signal from each of the functional blocks to the sequence control unit 307.

The image processing unit 308 performs color separation/conversion processing on the image data input from the host apparatus 1, and performs image processing for converting the image data into print data based on which printing can be performed by the printhead 201. The timing control unit 309 transfers the print data converted and generated by the image processing unit 308 to the head control unit 310 in conjunction with the position of the carriage 202. The timing control unit 309 also controls a print data ejection timing. This timing control is performed according to the ejection timing determined based on an ejection speed calculated in ejection speed calculation processing to be described below. The head control unit 310 functions as an ejection signal generation unit. The head control unit 310 converts the print data input from the timing control unit 309 into an ejection signal and outputs the ejection signal. The head control unit 310 also controls the temperature of the printhead 201 by outputting a control signal at a level that is not enough to cause ink ejection, based on an instruction from the sequence control unit 307. The head control circuit 305 functions as a driving pulse generation unit. The head control circuit 305 generates a driving pulse according to the ejection signal input from the head control unit 310 and applies the generated driving pulse to the printhead 201.

Figure 4A:
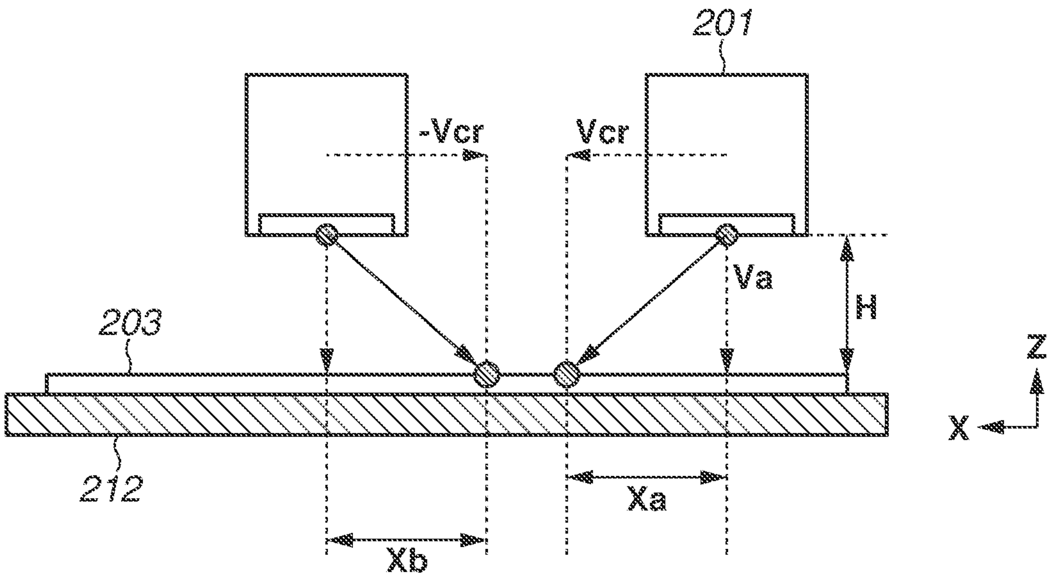
FIGS. 4A and 4B are schematic diagrams each illustrating a correlation between an ejection speed and a landing position of an ink droplet.

Next, ejection timing adjustment processing will be described with reference to FIGS. 4A and 4B. FIG. 4A is a schematic diagram illustrating a relationship between an ejection speed and a landing position of an ink droplet. A distance between the ejection port surface 201*a* of the printhead 201 and the recording medium 203 in a Z-direction is represented by H. The printhead 201 ejects ink while performing reciprocating scanning at a scanning speed Vcr in the X-direction, to print an image on the recording medium 203. An ejection speed of an ink droplet ejected from the printhead 201 is represented by Va. As illustrated in FIG. 4A, since a direction of forward scanning is different from a direction of backward scanning, landing positions of ink relative to respective ink droplet ejected positions varies. To align land positions of ink droplets ejected by the printhead 201, an ink droplet ejection timing is adjusted. First, a distance Xa from a position where an ink droplet is ejected during the forward direction scanning to a position where the ink droplet is landed on the recording medium 203 is expressed by the following expression.

$$Xa=(H/Va)\times Vcr$$

A distance Xb from a position where an ink droplet is ejected during the backward direction scanning to a position where the ink droplet is landed on the recording medium 203 is expressed by the following expression.

$$Xb=(H/Va)\times(-Vcr)=-Xa$$

By the above-described expressions, an appropriate ejection timing for a position of the printhead 201 that is detected by the encoder sensor 210 is calculated based on the distance between the printhead 201 and the recording medium 203 and the ejection speed of the ink droplet detected by the droplet detection sensor 205. In the present exemplary embodiment, a default ejection speed and an ejection timing for the default ejection speed are determined in advance and stored in the memory 303. An adjustment value for an ejection timing for the default ejection speed is set to "0", and ejection timing adjustment is performed using adjustment values "−4" to "+4" in accordance with an ejection speed. The adjustment is made in units of 1200 dpi. A table in which ejection speeds and ejection timing adjustment values are associated with each other is stored in the memory 303. An ejection timing adjustment value in accordance with an ejection speed acquired in the ejection speed calculation processing illustrated in FIG. 7 to be described below is acquired from the table, and the ejection timing is adjusted.

Figure 4B:
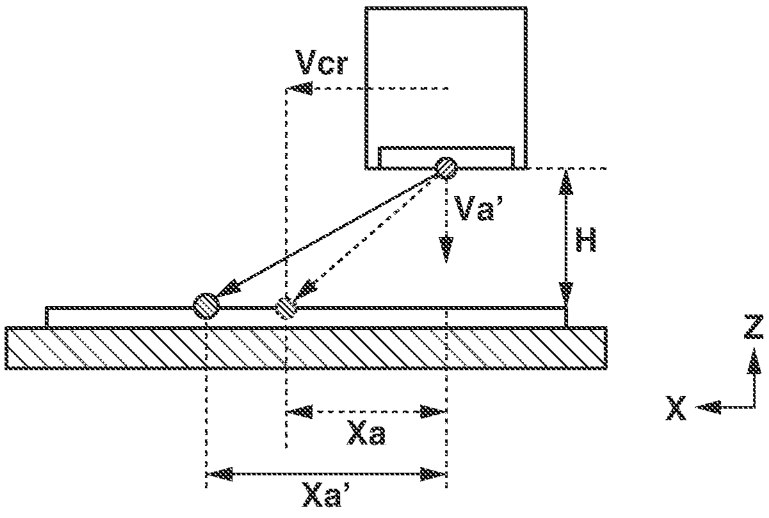

FIG. 4B illustrates a case where an ejection speed of an ink droplet detected by the droplet detection sensor 205 is decreased from the ink droplet ejection speed illustrated in FIG. 4A described above. In this case, a distance Xa' from a position where an ink droplet is ejected during the forward direction scanning to a position where the ink droplet is landed on the recording medium 203 is expressed by the following expression.

$$Xa'=(H/Va')\times Vcr$$

If an ejection speed of the ink droplet that is ejected from the printhead 201 and is landed on the recording medium 203 is attenuated by 10%, a distance from the ejection position to the landing position can be calculated by the following expression.

$$Xa'=(H/Va')\times Vcr$$

$$=(H/(Va\times 0.9))\times Vcr$$

$$=1.11\times Xa$$

As described above, in a case where an ejection speed is decreased, the landing position deviates in the scanning direction of the printhead 201. By obtaining the distance from the ejection position to the landing position, an appropriate ejection timing adjustment value can be obtained based on the ejection speed, like in FIG. 4A. In the first exemplary embodiment, the thickness of the recording medium 203 is sufficiently small, and thus a distance between the ejection port surface 201*a* of the printhead 201 and the recording medium 203 can be regarded to be equal to a distance between the ejection port surface 201*a* and the platen 212.

Next, a method for calculating an ejection speed of an ink droplet ejected from the printhead 201 according to the present exemplary embodiment will be described with reference to FIGS. 5A to 5D. FIGS. 5A to 5D are schematic sectional views each illustrating the printhead 201 and the droplet detection sensor 205 when the printing apparatus 100 is taken along a line Y-Z. FIGS. 5A to 5D also illustrate timing diagrams each illustrating an ejection signal for applying a driving pulse to the printhead 201 and a detection signal obtained when the droplet detection sensor 205 detects the passage of an ink droplet.

As illustrated in FIG. 5A, the printhead 201 includes the ejection port surface 201*a*. The droplet detection sensor 205 includes the light-emitting element 401, the light-receiving element 402, and the control circuit board 403. The light-emitting element 401 emits light 404, and the light-receiving element 402 receives the light 404 emitted from the light-emitting element 401. The control circuit board 403 detects the amount of light received by the light-receiving element 402. Since the amount of received light decreases as the ink droplet passes through the light 404, the passage of the ink droplet can be detected. The droplet detection sensor 205 is disposed such that an optical axis of the light 404 is arranged at the same position in the Z-direction on the surface of the platen 212 where the recording medium 203 is supported. A slit is formed in the vicinity of each of the light-emitting element 401 and the light-receiving element 402 so that the light 404 to be incident is narrowed down, which improves a signal to noise (S/N) ratio. In the X-direction, the positional relationship between the droplet detection sensor 205 and the printhead 201 in which the ink droplet ejected from the printhead 201 passes through the light 404 of the droplet detection sensor 205 is set as the positional relationship for detection. In ink droplet detection to calculate an ejection speed of an ink droplet, the sequence control unit 307 causes the sensor/motor control unit 302 to control the carriage motor 208, to cause the printhead 201 to move to a position for detection. A light beam sectional area of the light 404 according to the present exemplary embodiment is about 1

(mm$^2$). A parallel light projection area of the ink droplet that has passed through the light 404 is about $2^{-3}$ (mm$^2$).

FIG. 5A illustrates a state where a distance in a height direction (Z-direction) between the ejection port surface 201*a* of the printhead 201 and the light 404 emitted from the light-emitting element 401 corresponds to a distance H1. In a case where the distance between the ejection port surface 201*a* and the light 404 does not correspond to the distance H1, the sensor/motor control unit 302 drives the lift motor 211 to cause the lift cam to move the printhead 201 in the height direction. In the state illustrated in FIG. 5A, an ejection signal from the head control unit 310 in the CPU 301 is transmitted to the head control circuit 305 via the driver unit 306. The driver unit 306 transmits a timing of when the ejection signal is transmitted to the sequence control unit 307. The head control circuit 305 generates a driving pulse according to the ejection signal, and applies the driving pulse to the printhead 201, to cause the printhead 201 to eject ink from the ejection port. In a case where an ink droplet passes through the light 404 emitted from the light-emitting element 401 and the amount of light received by the light-receiving element 402 is changed, the control circuit board 403 outputs a timing of when the amount of received light is changed as a detection signal. The output detection signal is sent to the sequence control unit 307 via the sensor/motor control unit 302. Further, the sequence control unit 307 detects a detection period T1 from when the ejection signal is generated until when the detection signal is output. As described above, the sequence control unit 307 functions as a period detection unit that detects a period from when ejection of an ink droplet is started until when the ejected ink droplet is detected, and detects a detection period for calculating an ejection speed.

Figure 5B:
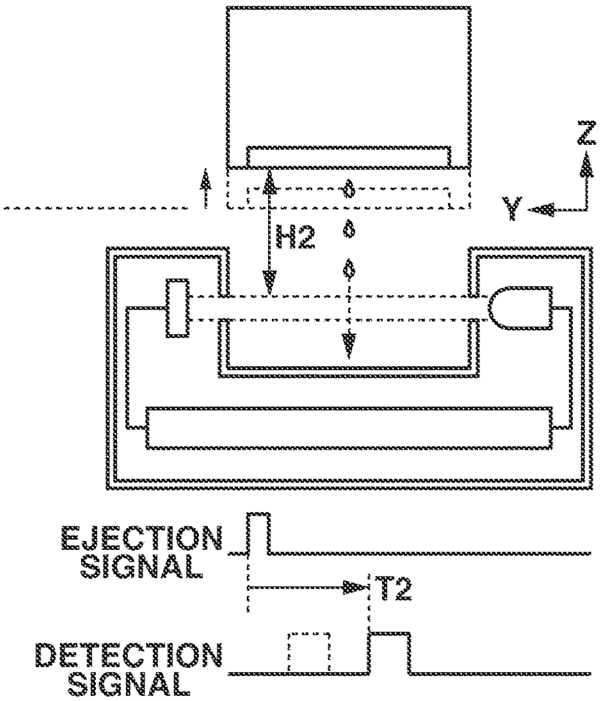

FIG. 5B illustrates a state where the lift motor 211 is driven after the ink droplet is detected in FIG. 5A and the distance in the height direction (Z-direction) between the ejection port surface 201*a* of the printhead 201 and the light 404 emitted from the light-emitting element 401 corresponds to a distance H2. Like in FIG. 5A, a timing of when the amount of light received by the light-receiving element 402 is changed by an ink droplet passing through the light 404 of the droplet detection sensor 205 is output as a detection signal. Then, a detection period T2 from when the ejection signal for causing the printhead 201 to eject an ink droplet is generated until when the detection signal is output is detected by the sequence control unit 307.

After the detection periods T1 and T2 are detected in the states illustrated in FIGS. 5A and 5B, respectively, the sequence control unit 307 calculates an ejection speed V1 of the ink droplet passing a distance between the distance H2 and the distance H1 based on a difference between the detection period T1 and the detection period T2 and a difference between the distance H1 and the distance H2. The ejection speed V1 is calculated by the following expression.

$$V1=(H2-H1)/(T2-T1)$$

Figure 5C:
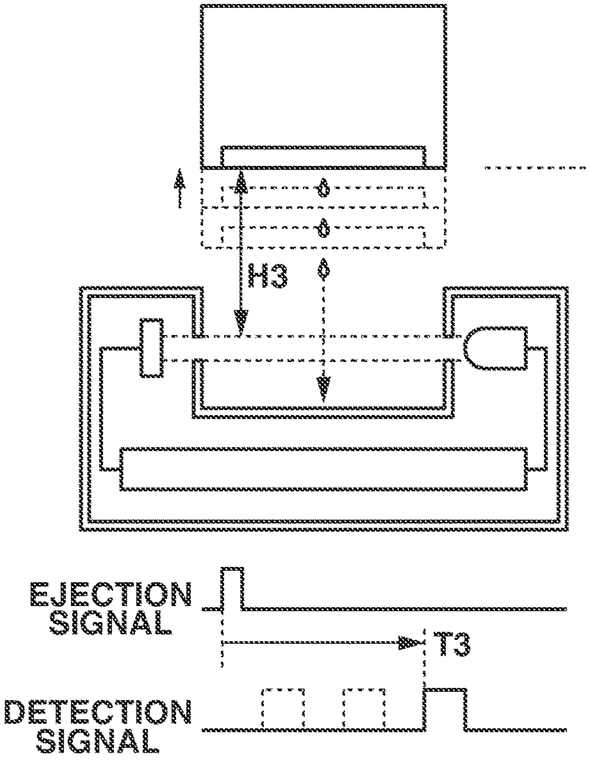

After the ejection speed V1 is calculated, the lift motor 211 is driven to move the ejection port surface 201*a* and the light 404 to be spaced apart from each other in the height direction by a distance H3 that is longer than the distance H2. This state is illustrated in FIG. 5C. Like in FIGS. 5A and 5B, the control circuit board 403 detects, as a detection signal, a timing of when the amount of light is changed by an ejected ink droplet passing through the light 404 of the droplet detection sensor 205 after the ink droplet is ejected from the ejection port of the printhead 201. Then, a detection period T3 from when an ejection signal for causing the printhead 201 to eject the ink droplet is generated until when the detection signal is output is detected by the sequence control unit 307. In the same manner as described above with reference to FIGS. 5A and 5B, an ejection speed V2 of the ink droplet passing a distance between the distance H3 and the distance H2 is calculated based on a difference between the detection period T2 and the detection period T3 detected at the distance H2 and the distance H3, respectively, and a difference between the distance H2 and the distance H3. The ejection speed V2 is calculated by the following expression.

$$V2=(H3-H2)/(T3-T2)$$

Figure 5D:
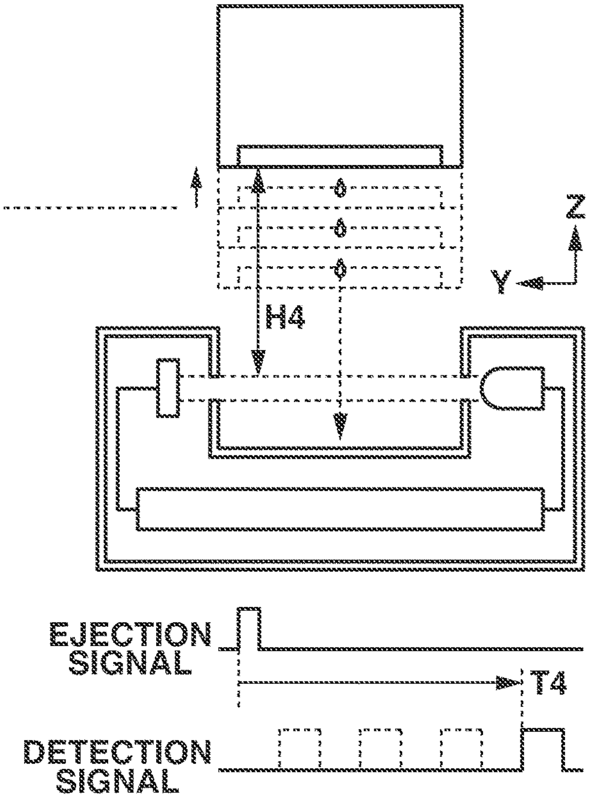

After the ejection speed V2 is calculated, the lift motor 211 is further driven to move the ejection port surface 201*a* and the light 404 to be spaced apart from each other in the height direction by a distance H4 that is longer than the distance H3. This state is illustrated in FIG. 5D. Like in FIGS. 5A, 5B, and 5C, the control circuit board 403 detects a timing of when the amount of light is changed by an ejected ink droplet passing through the light 404 of the droplet detection sensor 205 after the ink droplet is ejected from the ejection port of the printhead 201, and outputs a detection signal. Then, a detection period T4 from when an ejection signal for causing the printhead 201 to eject the ink droplet is generated until when the detection signal is output is detected by the sequence control unit 307. In the same manner as described above with reference to FIGS. 5A to 5C, an ejection speed V3 of the ink droplet passing a distance between the distance H4 and the distance H3 is calculated based on a difference between the detection period T3 and the detection period T4 detected at the distance H3 and the distance H4, respectively, and a difference between the distance H3 and the distance H4. The ejection speed V3 is calculated by the following expression.

$$V3=(H4-H3)/(T4-T3)$$

As described above, the distance between the printhead 201 and the droplet detection sensor 205 is changed and the detection period at each distance is detected, to calculate the ejection speed V of an ink droplet. The present exemplary embodiment described above illustrates an example where detection periods are detected in ascending order of distance. However, the detection order is not limited to this example. For example, detection periods may be detected in descending order of distance. In the present exemplary embodiment, the distance H is in a range from 1.2 mm to 2.2 mm.

An ejection speed may be calculated by measuring detection periods at a larger number of distances between the printhead 201 and the droplet detection sensor 205. In this case, ejection speeds corresponding to a larger number of distances can be calculated, which makes it possible to obtain more detailed information about whether an attenuation effect of ejection speeds (whether ejection speeds are constant or variable depending on distances). Consequently, it is possible to obtain an ink droplet ejection speed and an attenuation effect with higher accuracy.

Figure 6A:
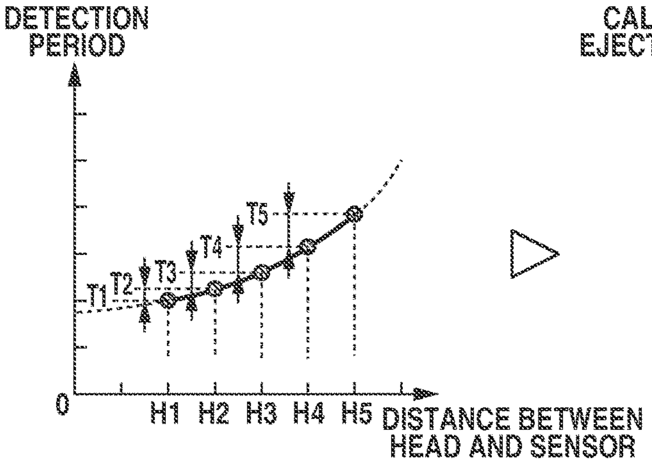
FIGS. 6A, 6B, 6C, and 6D are graphs illustrating a detection period and an ejection speed according to the first exemplary embodiment.
Figure 6B:
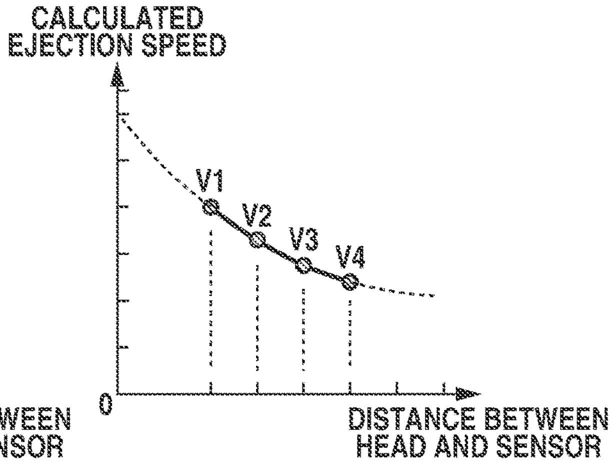
Figure 6C:
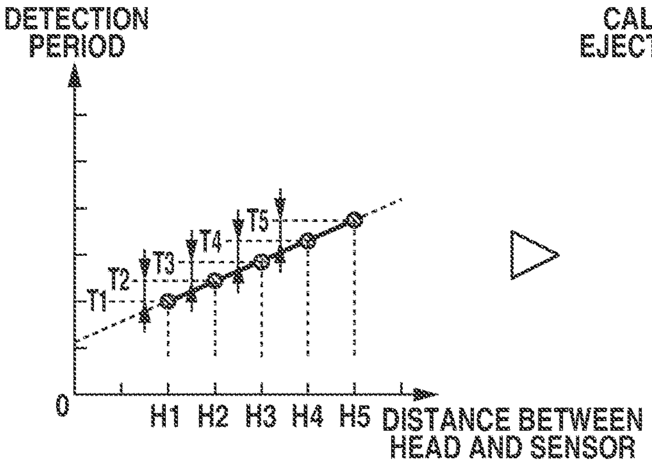
Figure 6D:
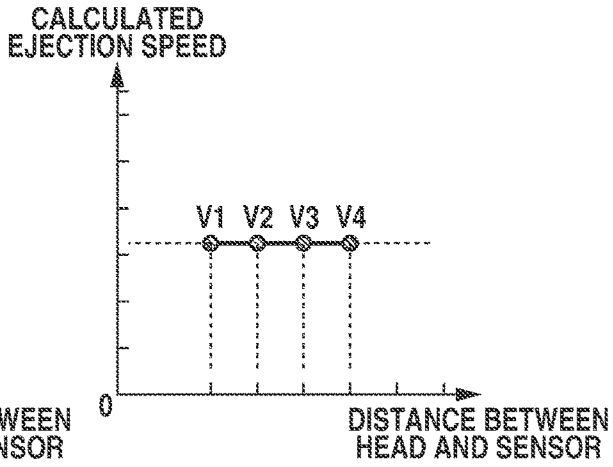

FIGS. 6A and 6C are graphs each illustrating the distance between the ejection port surface 201*a* and the light 404 of the droplet detection sensor 205 and the detection period output result at each distance as described above with reference to FIGS. 5A to 5D. FIGS. 6B and 6D are graphs each illustrating a relationship between the ejection speed calculated based on the distances and the detection periods illustrated in FIGS. 6A and 6C and the difference between the distances.

In the graph illustrated in FIG. 6A, the vertical axis represents the detection period detected by the sequence control unit 307, and the horizontal axis represents the distance between the ejection port surface 201*a* of the printhead 201 and the light 404 of the droplet detection sensor 205. Points represented by hatched circles in FIG. 6A correspond to actually measured points. In the present exemplary embodiment, the detection periods are detected at distances H1 to H5, respectively. The distance H5 is further away from the distance H4.

In the graph illustrated in FIG. 6B, the vertical axis represents the ejection speed, and the horizontal axis represents the difference between distances. Data that transitions non-linearly due to various effects can be obtained as calculated ejection speed data. Accordingly, an approximate curve representing an expression composed of two or more terms is obtained based on the acquired ejection speed data, to more accurately calculate the ejection speed data for each difference between distances, and the two or more terms in the obtained approximate curve are used as an expression representing an ejection speed. To obtain the approximate curve, three or more ejection speeds are used. To calculate three or more ejection speeds, it may be desirable to detect detection periods at four or more distances. The method for calculating ejection speeds is described above.

The inventors of the present invention have experimentally confirmed that there is a possibility that data that transitions linearly can be obtained depending on individual differences of printheads, differences in physical properties between ink colors, and the use status and environmental impacts. FIG. 6C illustrates an example of data that transitions linearly. Also, in this case, an ejection speed can be calculated based on a detection period at each distance and a difference in the distance between the ejection port surface 201*a* and the light 404 in the same manner as described above. FIG. 6D illustrates a relationship between the calculated ejection speed and the difference between distances. As illustrated in FIG. 6D, the ejection speed calculated based on the difference between distances is constant at any difference between distances. In a case where it is obvious that data that transitions linearly can be obtained, the ejection speed is constant regardless of the distance, and thus it is sufficient to obtain a single ejection speed. To calculate a single ejection speed, detection periods at two distances may be detected.

Even in a case where an ejection speed transitions non-linearly, the approximate curve may not be calculated in the case of performing printing only when the distance between the ejection port surface 201*a* and the recording medium 203 is constant. In this case, detection periods at two distances, including the distance for printing, may be detected.

Figure 7:
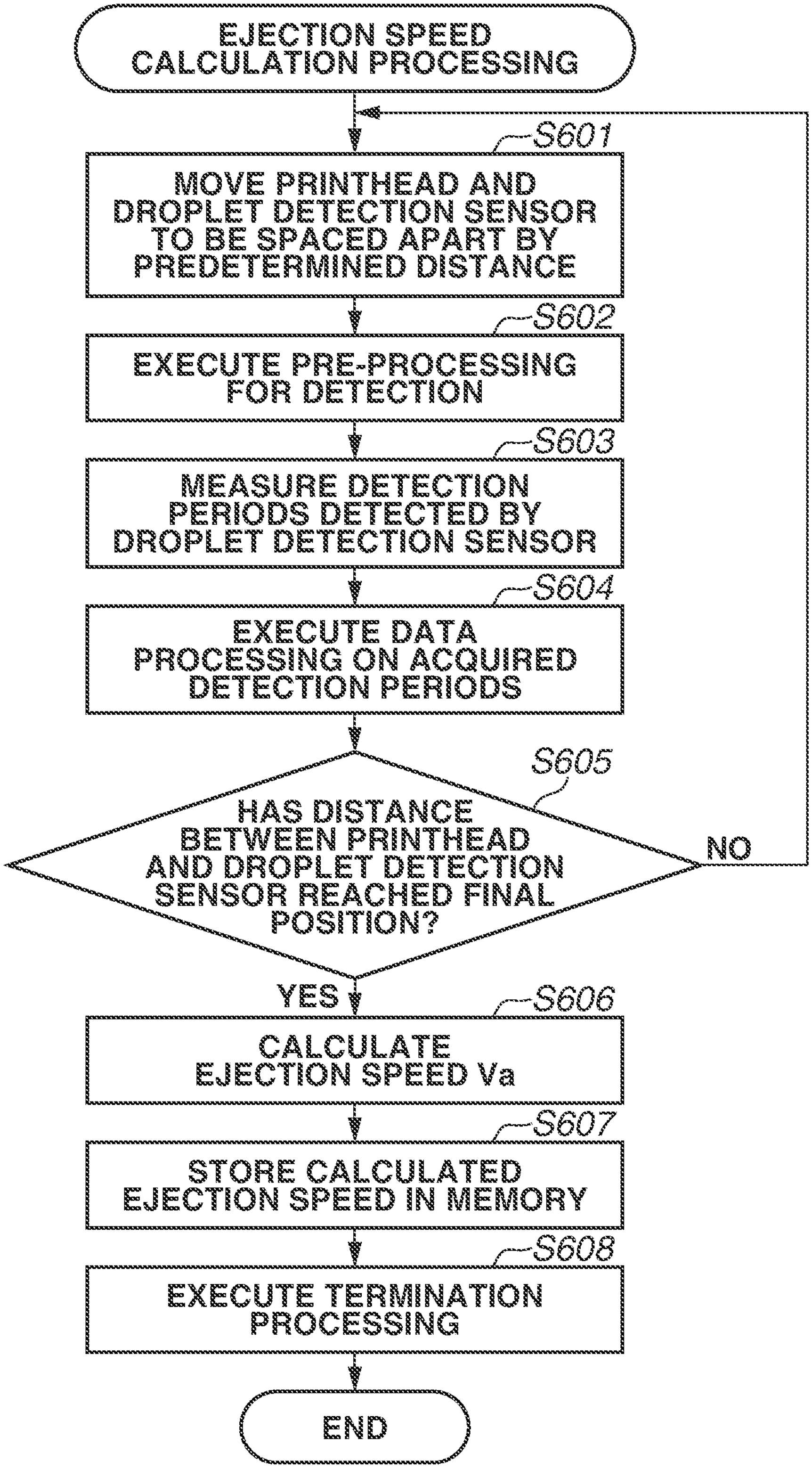
FIG. 7 is a flowchart illustrating ejection speed calculation processing according to the first exemplary embodiment.

FIG. 7 is a flowchart illustrating ejection speed calculation processing corresponding to FIGS. 5A to 5D and FIGS. 6A to 6D.

The ejection speed calculation processing illustrated in FIG. 7 is processing that is executed, for example, when a user of the printing apparatus 100 first operates the printing apparatus 100 in an initial installation operation, or when the printhead 201 is replaced with a new printhead and the new printhead is mounted. This processing may be periodically executed as maintenance, or may be executed according to a user's instruction. The processing illustrated in FIG. 7 is processing that is executed by the sequence control unit 307 of the CPU 301, based on, for example, programs stored in the memory 303.

First, in step S601, the sequence control unit 307 drives the lift motor 211 to cause the printhead 201 and the droplet detection sensor 205 to be spaced apart from each other by a predetermined distance. Distances by which the printhead 201 and the droplet detection sensor 205 are spaced apart from each other are preliminarily set in the memory 303. In the present exemplary embodiment, the distances H1 to H4 described above with reference to FIGS. 5A to 5D are set. As described above with reference to FIGS. 5A to 5D, the printhead 201 and the droplet detection sensor 205 are spaced apart from each other by the distances H1, H2, H3, and H4, in this order.

Next, in step S602, pre-processing for detecting an ejection speed is executed. Specific examples of pre-processing include presetting of an optimal ejection control for detecting an ejection speed, a preliminary ejection operation for stably ejecting ink droplets, and a suction fan stop operation for stabilizing an airflow control in the printing apparatus 100.

Next, in step S603, an ejection operation for ejecting ink droplets for inspection from the printhead 201 is executed to the light 404 emitted from the light-emitting element 401 of the droplet detection sensor 205. Specifically, a detection period from when the ejection of an ink droplet from a predetermined nozzle of the printhead 201 is started until when the light-receiving element 402 of the droplet detection sensor 205 detects that the ink droplet has passed through the light 404 is detected at the distance set in step S601. In this operation, as the detection period, a plurality of detection periods is detected using a plurality of nozzles of the printhead 201. The nozzles with which the detection period is measured may be desirably selected from among a wide range of nozzles, including the nozzles at both ends and the nozzle at the center, so that an ejection speed can be detected with high accuracy.

Next, in step S604, data processing is executed on the detection period acquired in step S603, and the detection period corresponding to the distance set in step S601 is calculated. Specifically, averaging processing based on a number of samples that may be desirable to stabilize the measurement of the detection period, and data processing, such as deletion of data that falls outside of upper and lower error ranges, to avoid mixture of abnormal values of data.

Next, in step S605, it is determined whether the detection period is detected for all distances set in the memory 303. In the present exemplary embodiment, it is determined whether the current distance between the ejection port surface 201*a* and the light 404 of the droplet detection sensor 205 corresponds to the distance H4 that is the final distance by which the printhead 201 and the droplet detection sensor 205 are spaced apart from each other. In a case where the current distance does not correspond to the distance H4 (NO in step S605), the processing returns to step S601 to move the droplet detection sensor 205 and the printhead 201 to be spaced apart from each other by the subsequently set distance and execute the subsequent data acquisition and processing. In step S605, in a case where it is determined that the current distance corresponds to the distance H4 (YES in step S605), it is determined that the acquisition of the detection period for all distances is completed, and then the processing proceeds to step S606.

In step S606, an ejection speed is calculated. Specifically, as described above with reference to FIGS. 5A to 5D and FIGS. 6A to 6D, an ejection speed is calculated based on the difference between distances and the detection period at each distance. After the ejection speed is calculated, the processing proceeds to step S607. In step S607, information about the ejection speed calculated in step S606 is stored in the memory 303. The ejection speed information stored in this operation is used for subsequent data processing and driving control processing for the printhead 201 in accordance with the required processing.

Next, in step S608, termination processing is executed. Specifically, since the calculation of the ejection speed is completed, the printhead 201 is retracted to a predetermined position, or the processing shifts to a standby state for subsequent printing operation processing, and the processing further shifts to cleaning processing or the like for the printhead 201, based on the acquired ejection speed information, and then the processing is terminated.

After the ejection speed calculation processing illustrated in FIG. 7 is terminated, the table in which the ejection speeds preliminarily stored in the memory 303 are associated with adjustment values for ejection timings is acquired and the ejection timing adjustment value is acquired from the table, based on the ejection speed acquired in the processing illustrated in FIG. 7, and then ejection timing adjustment processing is executed. In the case of printing an image, the timing control unit 309 controls the timing of ejecting ink based on print data.

As described above, in the present exemplary embodiment, the distance between the printhead 201 and the droplet detection sensor 205 is changed and a period from when an ink droplet is ejected until when the ink droplet is detected is detected at each of a plurality of distances. Further, the ejection speed is calculated based on a difference between distances and a difference between detection periods. Thus, the ink drop ejection speed can be calculated with high accuracy even in a state where the components are not assembled with high accuracy. Further, detection periods at four or more distances are detected, whereby more accurate data acquisition can be performed for individual differences of printing apparatuses and printheads, differences in physical properties between ink colors, the use status and environmental impacts, and the attenuation effect of the ejection speed at each distance between the printhead 201 and the droplet detection sensor 205. Furthermore, since the ejection timing is adjusted based on the ejection speed, deterioration in the image quality due to misalignment of landing positions can be prevented.

While the exemplary embodiment described above illustrates a configuration in which the printhead 201 is moved relatively to the droplet detection sensor 205 to change the distance between the printhead 201 and the droplet detection sensor 205, any configuration may be employed as long as the distance between the droplet detection sensor 205 and the printhead 201 in the Z-direction can be relatively changed. Accordingly, for example, the distance may be changed by moving the droplet detection sensor 205 in the Z-direction.

The exemplary embodiment described above illustrates a method of calculating an ejection speed based on the difference between distances and the difference between detection periods as a method for calculating an ejection speed using the droplet detection sensor 205. However, it is also possible to employ a method in which detection periods at a plurality of differences are acquired and an ejection speed is calculated based on the detection periods corresponding to the respective distances.

The present exemplary embodiment illustrates an example where nozzles with which detection periods for ejection speeds are measured are selected from a wide range of nozzles. Alternatively, a configuration in which an ejection speed is measured using nozzles that are used more frequently in printing may be employed in accordance with the use status of the user.

While an optical sensor is used as a sensor for detecting ink droplets in the present exemplary embodiment, any sensor other than an optical sensor can be used as long as the sensor can detect that an ink droplet has reached a predetermined position.

Next, a second exemplary embodiment will be described. In the first exemplary embodiment, the thickness of the recording medium 203 is not considered. However, in practice, the distance between the ejection port surface 201*a* and the platen 212 and the distance between the ejection port surface 201*a* and the recording medium 203 vary in accordance with the thickness of the recording medium 203. Particularly, in the case of performing printing using a thick recording medium, the adjustment value determined based on the distance between the ejection port surface 201*a* and the platen 212 may cause misalignment of ejection positions due to a variation in the distance between the ejection port surface 201*a* and the recording medium 203. In the present exemplary embodiment, the ejection timing is adjusted based on the distance between the ejection port surface 201*a* and the recording medium 203.

The distance between the ejection port surface 201*a* and the recording medium 203 is measured by the distance detection sensor 204. Further, the ejection timing is controlled based on the distance between the printhead 201 and the recording medium 203 detected by the distance detection sensor 204 and the ejection speed information calculated in the ejection speed calculation processing.

Figure 8A:
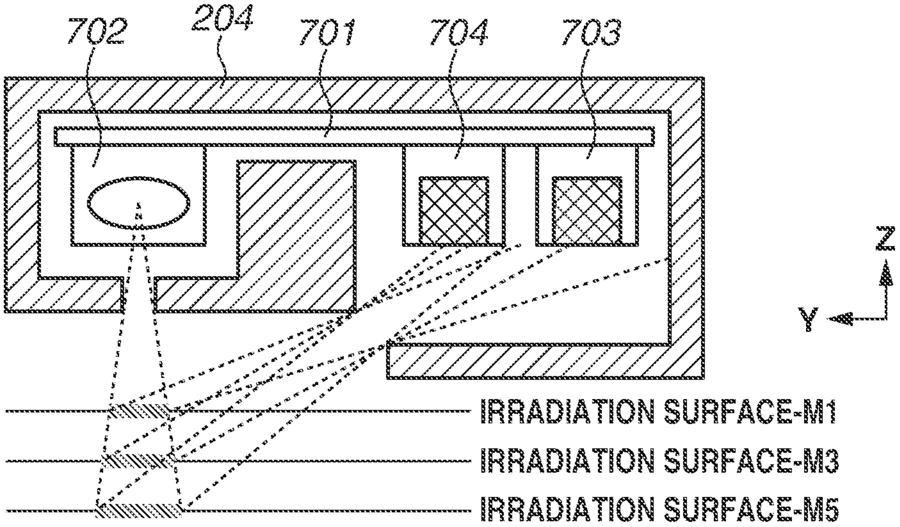
FIG. 8A is a diagram illustrating an example of an internal configuration of a distance detection sensor according to a second exemplary embodiment.
Figure 8B:
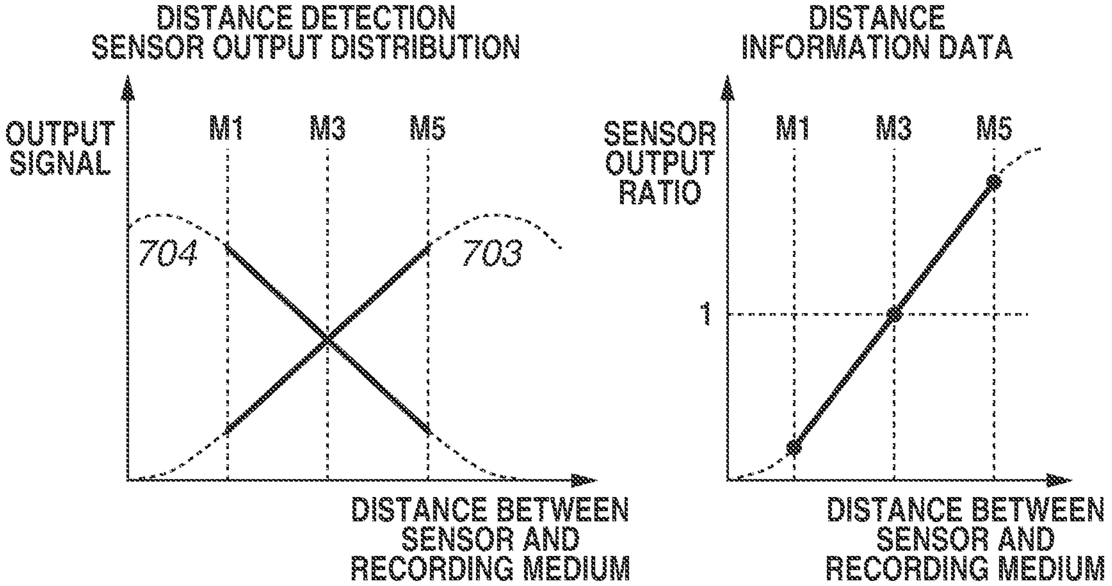
FIG. 8B is a diagram illustrating a relationship among a distance, an output signal, and distance information data.

FIG. 8A illustrates an internal configuration of the distance detection sensor 204, and FIG. 8B is a graph illustrating a change in the amount of light (output) in each of an irradiation area and a light-receiving area that varies in accordance with a distance from an irradiation surface of the recording medium 203. As illustrated in FIG. 8A, in the distance detection sensor 204, a control substrate 701 for performing processing for turning on and off a light source, a light-emitting unit 702 for irradiating the light, and light-receiving units 703 and 704 for receiving the reflected light are mounted at a position where the recording medium 203 is conveyed. In the present exemplary embodiment, the surface of the distance detection sensor 204 facing to the recording medium 203 is disposed at the same position in the Z-direction on the ejection port surface 201*a* of the printhead 201. Accordingly, the distance to the recording medium 203 measured by the distance detection sensor 204 corresponds to the distance between the ejection port surface 201*a* of the printhead 201 and the recording medium 203. Further, the intensity of the reflected light obtained by the light-receiving units 703 and 704 is converted into an output signal indicating a current value or a voltage value, and predetermined calculation processing is performed on the output signal, and then the processing result is stored in the memory 303. For example, data indicating a relationship between a ratio value of output signals obtained by the light-receiving units 703 and 704 and a distance from the printhead 201 to the recording medium 203 is stored as distance information data. FIG. 8B illustrates a relationship among a distance, an output signal, and distance information data. As illustrated in FIG. 8B, when the distance from the irradiation surface of the recording medium 203 corresponds to a distance M1, the amount of reflected light on the light-receiving unit 704 is maximum and the amount of reflected light on the light-receiving unit 703 is minimum. Accordingly, the ratio value of the output signal from the distance detection sensor 204, i.e., distance information data, indicates a minimum value. When the irradiation surface of the recording medium is at a distance M3, the amount of reflected light on the light-receiving units 703 and 704 is about half of a peak value. Accordingly, in an output distribution of the distance detection sensor 204, the output from the light-receiving unit 703 is equal to the output from the light-receiving unit 704, and thus the ratio value of the output signal from the distance detection sensor 204, i.e., distance information data, indicates "1". Further, when the irradiation surface of the recording medium is at a distance M5, the amount of reflected light on the light-receiving unit 704 is minimum and the amount of reflected light on the light-receiving unit 703 is maximum. Accordingly, in an output distribution of the distance detection sensor 204, the output from the light-receiving unit 704 indicates a minimum value and the output from the light-receiving unit 703 indicates a maximum value, and the ratio value of the output signal from the distance detection sensor 204, i.e., distance information data, also indicates a maximum value. The relationship between the reference position of the irradiation surface and the ratio value of the output signal from the distance detection sensor 204 may be obtained in advance and stored in the memory 303. For example, a value detected for the recording medium 203 of a predetermined thickness can be held as a reference value. Further, the position of the printhead 201 when the distance from the printhead 201 to the recording medium 203 is in a range from M1 to M5 and the distance from the printhead 201 to the droplet detection sensor 205 at each case can also be stored.

Figure 9A:
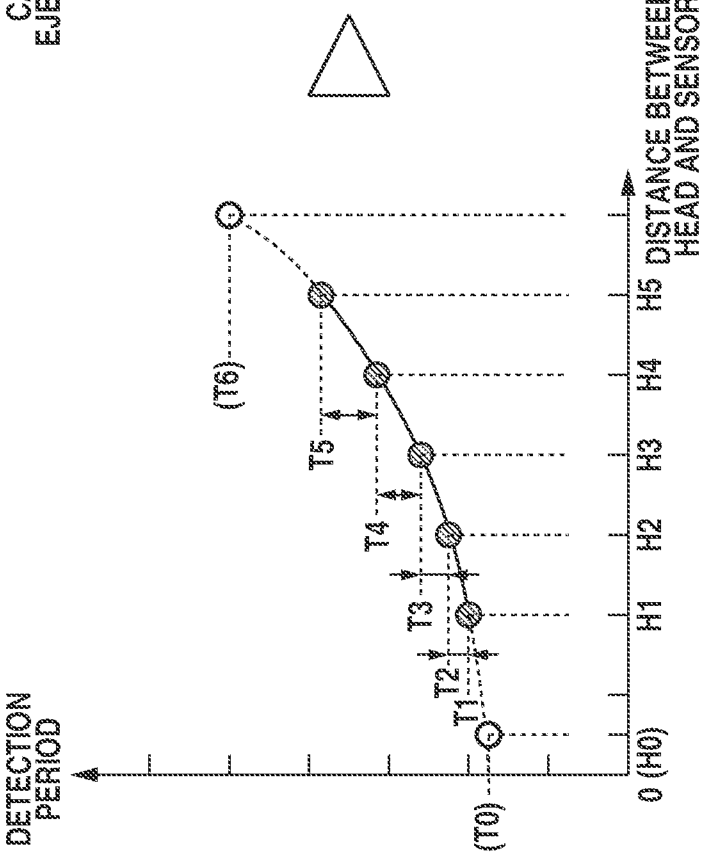
FIGS. 9A and 9B are graphs illustrating a detection period and an ejection speed according to the second exemplary embodiment.
Figure 9B:
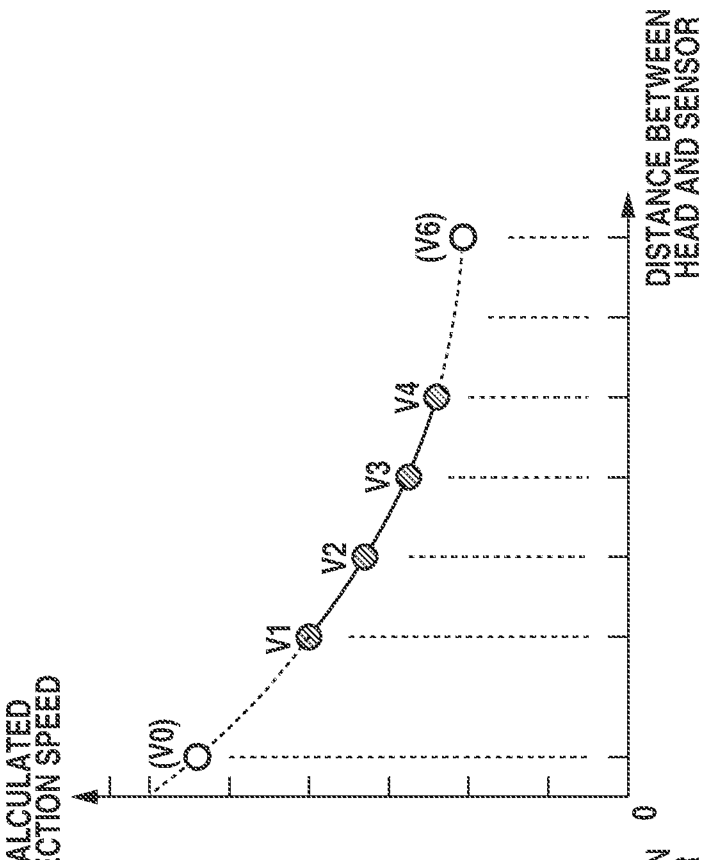

FIG. 9A is a graph illustrating the distances H1 to H5 by which the droplet detection sensor 205 and the printhead 201 are spaced apart from each other and the output result of the detection period detected at each distance by the droplet detection sensor 205. FIG. 9B is a graph illustrating a relationship between the distances illustrated in FIG. 9A and the ejection speed calculated based on the detection period. The detection period and the ejection speed are acquired by a method similar to that described in the first exemplary embodiment with reference to FIGS. 6A to 6D. As illustrated in FIGS. 9A and 9B, detection speeds at the respective distances H1 to H5 are acquired and ejection speeds V1 to V5 corresponding to the distances H1 to H5, respectively, are calculated. After the ejection speeds are acquired, an approximate curve representing the ejection speeds is obtained based on the acquired ejection speeds, like in the first exemplary embodiment.

To determine an ejection timing adjustment value, the recording medium 203 is first conveyed onto the platen 212 and the distance between the conveyed recording medium 203 and the ejection port surface 201*a* is measured by the distance detection sensor 204. Then, the speed corresponding to the measured distance between the ejection port surface 201*a* and the recording medium 203 is obtained from the approximate curve representing the ejection speeds. Thus, an ink droplet ejection speed is calculated based on the actually measured distance between the ejection port surface 201*a* and the recording medium 203, whereby more accurate calculation can be performed for an ejection speed.

Hatched circles in FIG. 9A represent measurement points. FIG. 9A illustrates the ink droplet detection periods when the printhead 201 and the droplet detection sensor 205 are moved to be spaced apart from each other by the distances H1 to H5. FIG. 9B illustrates a relationship between the ejection speed calculated based on FIG. 9A and the difference between distances. In this operation, distances (H0, H6, etc.) other than the measured distances H1 to H5 are interpolated on the approximate curve, based on the output result of the detection periods measured at the distances H1 to H5, whereby the detection period and the ejection speed can be predicted. Not only the distances, such as distances H0 and H6, which are away from the intervals of the distances H1 to H5, but also the speed and the like at a distance between H1 and H2 can also be obtained.

For example, in a case where an ejection speed when the distance between the ejection port surface 201*a* and the droplet detection sensor 205 is 1.0 mm and an ejection speed when the distance between the ejection port surface 201*a* and the droplet detection sensor 205 is 1.5 mm are calculated, an ejection speed in a case where the distance between the ejection port surface 201*a* and the recording medium 203 measured by the distance detection sensor 204 is 1.1 mm can be calculated by linearly interpolating the calculated ejection speed.

In the present exemplary embodiment described above, the distance between the ejection port surface 201*a* and the recording medium 203 is measured by the distance detection sensor 204, but instead may be calculated by a different method. For example, the thicknesses of various recording media to be used may be stored in the memory 303 and the target recording medium may be selected by the user from an operation panel on the printing apparatus 100, to set the distance. In this configuration, the distance detection sensor 204 may not be mounted.

After the ejection speed at the distance between the ejection port surface 201*a* and the recording medium 203 is calculated, the ejection timing adjustment value is acquired, based on the table held in the memory 303 and the calculated ejection speed in the same manner as in the first exemplary embodiment.

As described above, an ink droplet ejection speed is calculated based on the distance between the ejection port surface 201*a* of the printhead 201 and the recording medium 203, whereby more accurate calculation can be performed for the ejection speed. Since an ejection timing is adjusted based on a highly accurate ejection speed, misalignment of landing positions can be further prevented or reduced.

Next, a third exemplary embodiment will be described. An ink droplet ejection speed gradually decreases after a long use of the printhead 201. If an ejection speed decreases from when the ejection timing adjustment value is set, the set adjustment value may cause misalignment of ink droplet landing positions. Accordingly, the present exemplary embodiment illustrates a configuration in which the ejection timing adjustment value is set again at a predetermined timing after the ejection timing adjustment value is set once. In the present exemplary embodiment, redundant descriptions of components similar to those of the above-described exemplary embodiments are omitted.

Figure 10:
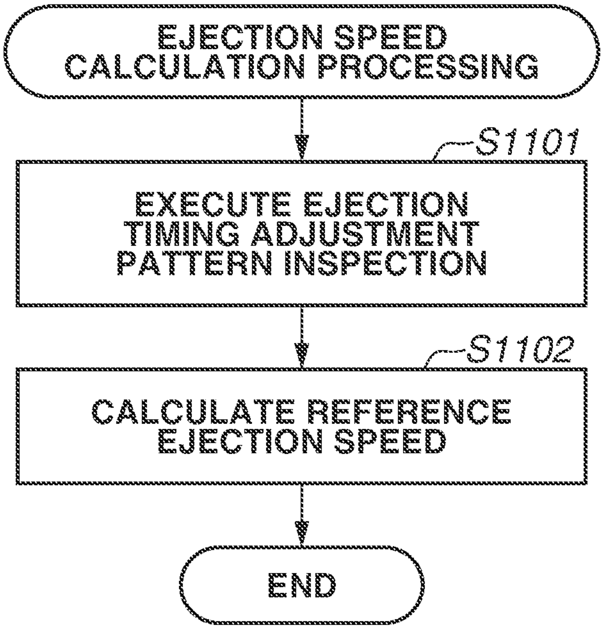
FIG. 10 is a flowchart illustrating ejection speed calculation processing according to a third exemplary embodiment.

FIG. 10 is a flowchart illustrating processing for determining the ejection timing adjustment value, based on an adjustment pattern and calculating an ejection speed based on the determined adjustment value. The processing illustrated in FIG. 10 is processing that is executed by the sequence control unit 307 of the CPU 301 based on, for example, programs stored in the memory 303. This processing is processing that is started during the initial installation operation for the printing apparatus 100, or when the printhead 201 is replaced with a new printhead. The processing may be started when the user issues an instruction via the operation panel of the printing apparatus 100 to print an adjustment pattern and adjust the ejection timing. The ink droplet ejection speed calculated in the processing illustrated in FIG. 10 is used as a reference ejection speed.

First, in step S1101, an ejection timing adjustment pattern inspection is executed. Specifically, an adjustment pattern for acquiring the ejection timing adjustment value is printed and the adjustment value is determined based on the adjustment pattern.

Figure 11:
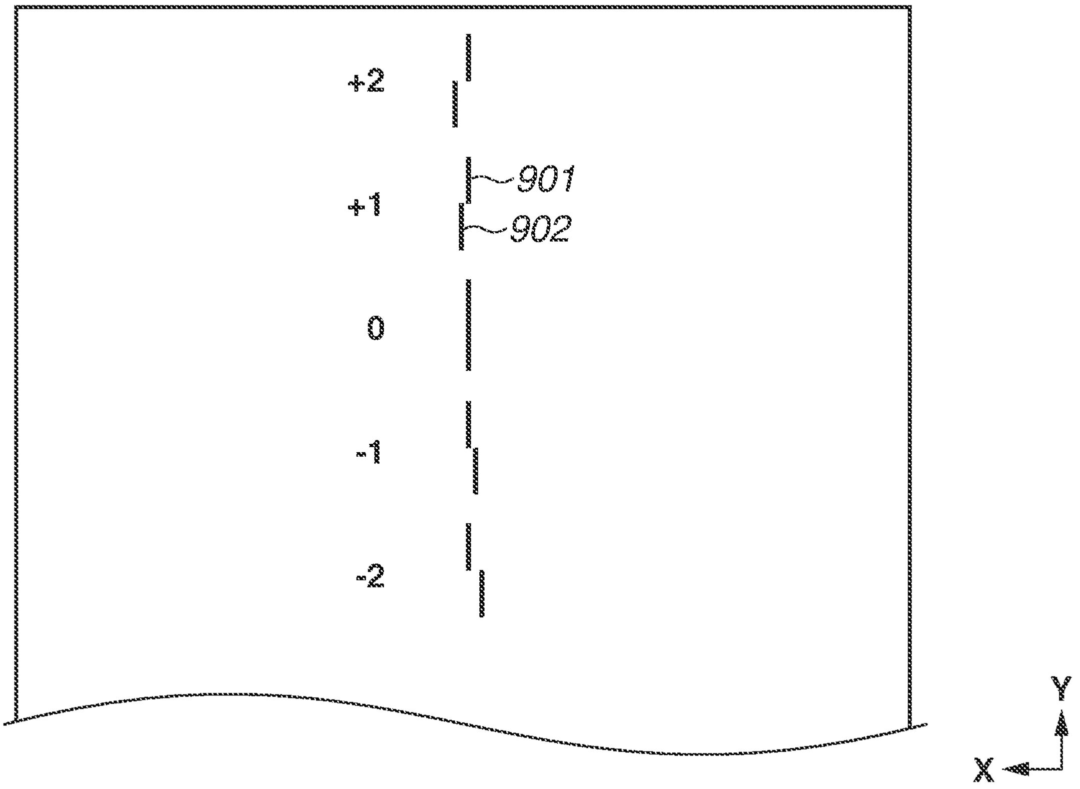
FIG. 11 is a diagram illustrating a pattern for adjusting misalignment of print positions according to the third exemplary embodiment.

FIG. 11 illustrates a pattern for adjusting misalignment of print positions in the forward direction and the backward direction according to the present exemplary embodiment. A vertical rule 901 is a ruled line pattern printed using 64 nozzles in each nozzle row during the forward direction scanning, and a vertical rule 902 is a ruled line pattern printed using 64 nozzles in each nozzle row during the backward direction scanning. To print these patterns, a carriage speed of 25 inches/sec and a drive frequency of 30 KHz are set as printing conditions. These patterns includes five patterns that are obtained by changing an ejection timing during the backward direction scanning so that a print position of the vertical rule 902 to be in five stages of "−2" to "+2" in units of 1/1200 inches based on the vertical rule 901. In this case, a minus (−) direction indicates that the print timing is set to be faster than the reference timing, and a plus (+) direction indicates that the print timing is set to be slower than the reference timing. A pattern with minimum misalignment between two ruled lines is selected from among the adjustment patterns described above, and the selected adjustment value is stored in the memory 303. The ejection timing in the scanning direction in which a non-reference ruled line is printed based on the selected adjustment value. In the printing apparatus 100 in which the optical sensor is provided on the carriage 202, a pattern with minimum misalignment between two vertical rules may be automatically detected. The user may input the value corresponding to the pattern with minimum misalignment between two vertical rules on an operation unit while viewing the recording sheet on which the adjustment pattern is printed.

Next, in step S1102, an ejection speed when the adjustment pattern is printed is calculated based on the adjustment value acquired in step S1101. An ejection speed when the adjustment pattern is printed is hereinafter referred to as a reference ejection speed. A method for calculating the reference ejection speed will be described with reference to FIGS. 4A and 4B.

When the adjustment value is determined, the amount of misalignment between landing positions from the adjustment value ("0" in this case) at the reference ejection timing can be determined. The misalignment amount can be expressed as misalignment amount=Xa'−Xa as described above with reference to FIGS. 4A and 4B. For example, when the adjustment value is determined to be "4", the ejection timing is shifted by 1/1200 inches from the reference position, which leads to a decrease in misalignment. The misalignment amount is the sum of misalignment in the forward direction and misalignment in the backward direction, and thus the misalignment amount Xa'−Xa during scanning in one direction is 1/2400 inches. The distance Xa between the position where an ink droplet is ejected at the reference ejection speed and the landing position is preliminarily stored in the memory 303. As described above, since the misalignment amount and the distance Xa can be determined, the distance Xa' from the ejection position at the current reference ejection speed can be calculated.

As described above with reference to FIGS. 4A and 4B, the distance Xa' from the ejection position to the landing position at the current reference ejection speed is expressed as Xa'=(H/Va')×Vcr. Based on this expression, the current reference ejection speed Va' is calculated by the following expression.

$$Va'=(H\times Vcr)/Xa'$$

The distance H between the ejection port surface 201$a$ and the recording medium 203 is measured by the distance detection sensor 204. The scanning speed Vcr of the printhead 201 is preliminarily stored in the memory 303. Further, as described above, the distance Xa' from the ejection position to the landing position at the current reference ejection speed is calculated based on the distance Xa and the misalignment amount acquired from the adjustment value determined based on the pattern. The current reference ejection speed Va' can be calculated by substituting the values into the expression. The calculated current reference ejection speed Va' is stored in the memory 303. In the present exemplary embodiment, patterns obtained when the distance between the ejection port surface 201$a$ and the recording medium 203 corresponds to the distance M1, the distance M3, and the distance M5 are printed and an ejection speed at each distance is calculated. By the processing described above, the adjustment value is determined and the reference ejection speed is calculated based on the adjustment pattern.

After a long use of the printhead 201, an ejection speed decreases over time. As an ejection speed decreases, misalignment of landing positions occurs when printing is performed using the adjustment value determined based on the adjustment pattern. Accordingly, an ejection speed is calculated using the droplet detection sensor 205 as described in the first and second exemplary embodiments at the predetermined timing after the adjustment pattern is printed, and the attenuation rate of the ejection speed from the time when an ejection speed is previously calculated is calculated. The ejection timing adjustment value is set based on the calculated attenuation rate. This processing will be described in detail with reference to FIG. 13.

Figure 12A:
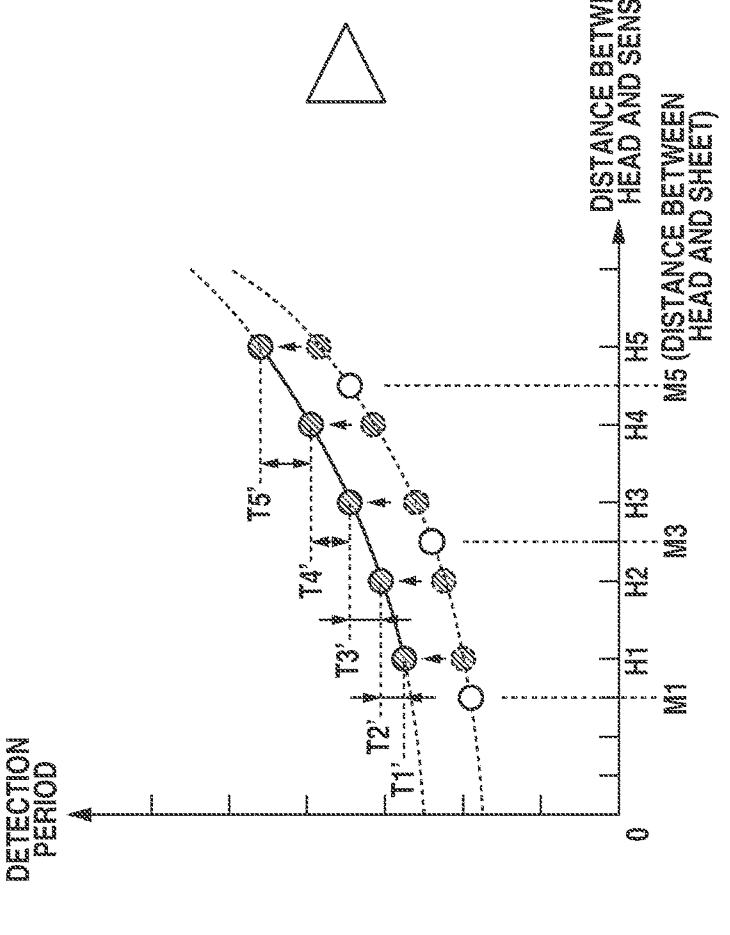
FIGS. 12A and 12B are graphs illustrating a detection period and an ejection speed according to the third exemplary embodiment.
Figure 12B:
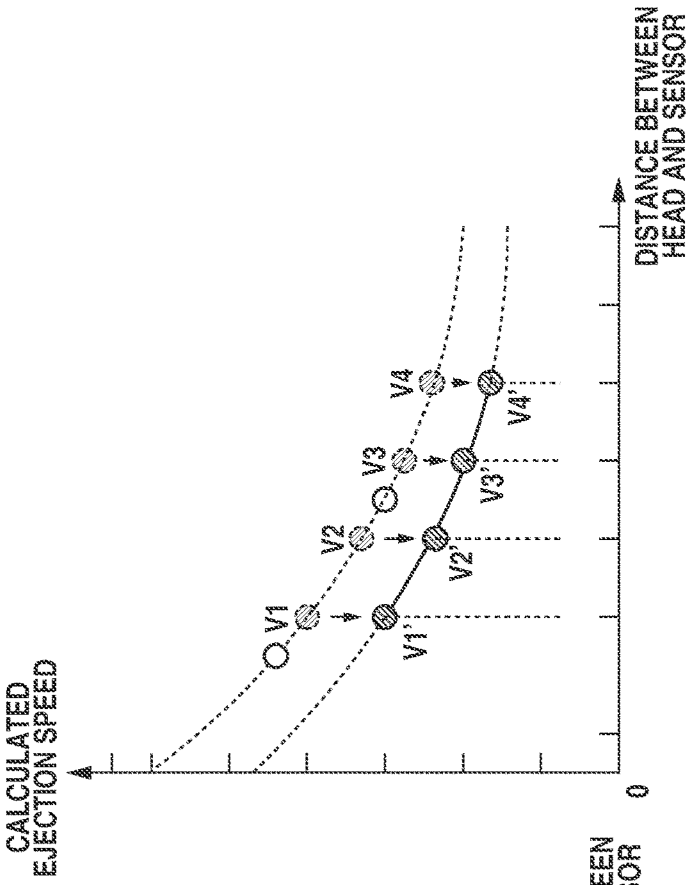

FIGS. 12A and 12B are graphs illustrating the ejection speed calculated based on the reference ejection speed and the detection period detected by the droplet detection sensor 205. In this case, the detection period is detected by the droplet detection sensor 205 at a timing after a timing of when the adjustment pattern for calculating the reference ejection speed is printed.

FIG. 12A is a graph illustrating the distance from the ejection port surface 201$a$ to the platen 212 or the recording medium 203 and the output result of the detection period at each distance. The horizontal axis represents the distance (e.g., H1 to H5) between the ejection port surface 201$a$ of the printhead 201 and the light 404 of the droplet detection sensor 205, or the distance (M1 to M5) from the ejection port surface 201$a$ to the recording medium 203. The vertical axis represents the detection period detected by the droplet detection sensor 205. FIG. 12B illustrates an ejection speed corresponding to the detection period and the distance illustrated in FIG. 12A.

Values represented by white circles in FIG. 12B indicate the reference ejection speeds of when the distances between the ejection port surface 201$a$ and the recording medium 203 calculated in the processing illustrated in FIG. 10 correspond to the distances M1, M3, and M5, respectively. Although not calculated in practice, the detection periods when the reference ejection speeds corresponding to the values illustrated in FIG. 12B are obtained are represented by white circles in FIG. 12A. An approximate curve representing the speeds is obtained based on the speeds represented by white circles in FIG. 12B, and thus ejection speeds corresponding to the distances H1 to H5, respectively, can be calculated. Detection periods and ejection speeds obtained in this case are represented by hatched circles surrounded by a dotted line.

Next, at the predetermined timing, in the same manner as the first exemplary embodiment, the detection periods detected by the droplet detection sensor 205 at the distances H1 to H5 are set as detection periods T1' to T5', respectively, as represented by hatched circles surrounded by a solid line in FIG. 12A. Ejection speeds V1' to V4' calculated based on the detection periods T1' to T5' are represented by hatched circles indicated by a solid line in FIG. 12B. An approximate curve representing the ejection speeds can be obtained based on the ejection speeds V1' to V4'.

Figure 13:
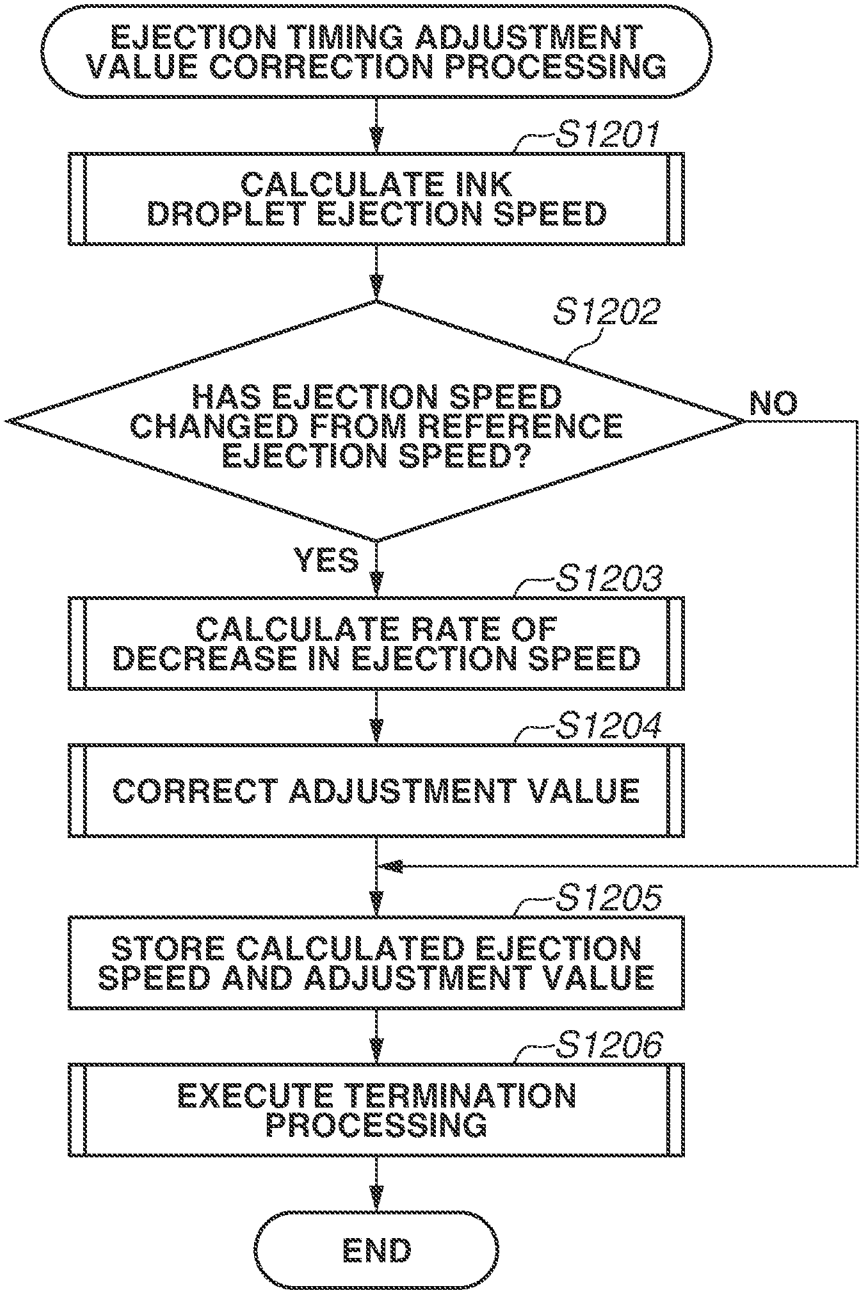
FIG. 13 is a flowchart illustrating ejection timing correction processing according to the third exemplary embodiment.

FIG. 13 illustrates ejection timing correction processing. As described above, this processing is performed at a timing after the timing of when the adjustment pattern for calculating the reference ejection speed at the detection period is printed. For example, the processing is performed when a predetermined period has elapsed after a time of when an ejection speed is previously calculated, when a predetermined number of ink droplets are ejected, or when a predetermined number of sheets are printed. In the present exemplary embodiment, the processing illustrated in FIG. 10 is completed before the processing illustrated in FIG. 13 is started. The processing illustrated in FIG. 13 is processing to be executed by the sequence control unit 307 of the CPU 301 based on, for example, programs stored in the memory 303.

First, in step S1201, an ejection speed of an ink droplet ejected from the printhead 201 is calculated by processing similar to the ejection speed detection processing illustrated in FIG. 7 according to the first exemplary embodiment. The ejection speeds V1' to V4' illustrated in FIG. 12B are calculated.

Next, in step S1202, each ejection speed calculated in step S1201 is compared with the reference ejection speed acquired in the processing illustrated in FIG. 10, and determination of whether the ejection speed has changed is performed. This determination is made by determining whether the difference between the reference ejection speed and the speed calculated in step S1201 is more than or equal to a threshold preliminarily stored in the memory 303. In a case where the difference is more than or equal to the threshold (YES in step S1202), the processing proceeds to step S1203. In a case where the difference is not more than or equal to the threshold (NO in step S1202), the processing proceeds to step S1205.

In step S1203, the rate of decrease in the ink droplet ejection speed acquired in step S1201 with respect to the reference ejection speed is calculated.

Next, in step S1204, processing for correcting the ejection timing adjustment value is executed based on the rate of decrease in the ink droplet ejection speed with respect to the reference ejection speed calculated in step S1203. Based on the attenuation rate, the adjustment value can be corrected by calculating a value by which the adjustment value is shifted from the adjustment value of when the ink droplet ejection speed corresponds to the reference ejection speed.

Next, in step S1205, the calculated ejection speed and the correction processing result are stored in the memory 303. In step S1206, termination processing is executed. The termination processing is processing similar to step S608 illustrated in FIG. 7 according to the first exemplary embodiment.

As described above, the adjustment of the ejection timing adjustment value makes it possible to set an appropriate ejection timing adjustment value with respect to the current ink droplet ejection speed, whereby deterioration in the image quality can be prevented.

An ejection speed may be calculated using the droplet detection sensor 205 at a timing of when a predetermined time has elapsed after the processing illustrated in FIG. 13 is finished, or at a timing of when a predetermined number of sheets are printed. In this case, an appropriate ejection timing adjustment value can be set by performing the processing illustrated in FIG. 13 using the ejection speed calculated in step S1201 illustrated in FIG. 13 as the reference speed.

In the processing illustrated in FIG. 13, misalignment between ink landing positions is corrected by correcting the ejection timing adjustment value in step S1204, but instead may be corrected by another method. For example, a pulse width of a driving pulse to be applied to the printhead 201 for ink ejection may be increased. An ejection speed can be set to a higher speed and an ejection speed can be corrected by increasing the pulse width in accordance with the attenuation rate of the ejection speed.

While the first reference ejection speed is calculated based on the adjustment pattern in the present exemplary embodiment described above, an ejection speed may be calculated using the droplet detection sensor 205 at a timing of when the adjustment pattern is printed. The adjustment value may be determined based on an ejection speed first calculated using the droplet detection sensor 205, and then the pattern may be printed to update the adjustment value.

The present exemplary embodiment can also be applied to any configuration including no function for printing the adjustment pattern for acquiring the ejection timing adjustment value, as long as the first adjustment value can be set based on an ejection speed calculated using the droplet detection sensor 205.

As described in the third exemplary embodiment, an ink droplet ejection speed gradually decreases after a long use of the printhead 201. In a case where an ejection speed decreases from when the ejection timing adjustment value is set, the set adjustment value may cause misalignment between ink droplet landing positions.

In a fourth exemplary embodiment, in a case where an ejection speed is calculated again and an adjustment value for an ejection timing is set again after an ejection speed is calculated once and an adjustment value for an ejection timing is set once, the number of distances at each of which a detection period is measured is reduced in a case where it is determined that there is no need to measure detection periods at a large number of distances. In the present exemplary embodiment, redundant descriptions of components similar to those in the above-described exemplary embodiments are omitted.

<Ejection Speed Information Update Processing>

Processing for calculating an ink droplet ejection speed again and updating the ejection speed information will be described with reference to FIG. 14. An ink droplet ejection speed gradually decreases after a long use of the printhead 201. In a case where an ejection speed decreases from when the ejection timing adjustment value is set based on the ejection speed calculated in the ejection speed calculation processing illustrated in FIG. 7, the set adjustment value may cause misalignment between ink droplet landing positions. Accordingly, in a case where it is determined that misalignment between ink droplet landing positions occurs due to a decrease in an ejection speed, the current ejection speed is calculated and the ejection timing adjustment value is set again.

Figure 14:
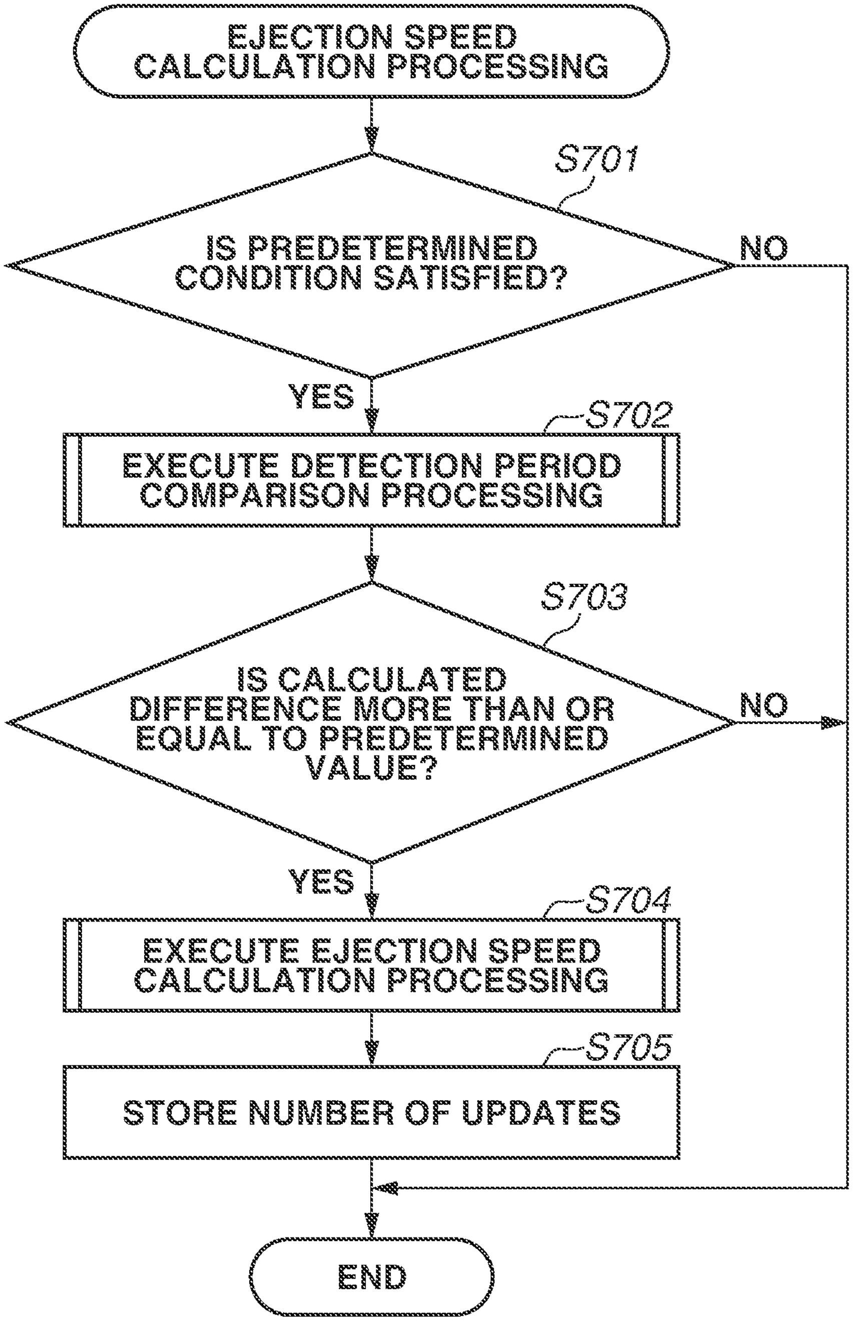
FIG. 14 is a flowchart illustrating ejection speed update processing according to a fourth exemplary embodiment.

FIG. 14 is a flowchart illustrating processing for updating the ejection speed information. The processing illustrated in FIG. 14 is processing to be executed after an ejection speed is calculated in the processing illustrated in FIG. 7. This processing is processing that is performed by the sequence control unit 307 of the CPU 301 based on, for example, programs stored in the memory 303.

First, in step S701, determination of whether a predetermined condition is satisfied is performed. In the present exemplary embodiment, it is determined that the predetermined condition is satisfied in a case where the number of ink droplets ejected from the ejection ports for all ink colors of the printhead 201 has reached a predetermined number or more after the processing illustrated in FIG. 7 is finished or after the previous processing illustrated in FIG. 14 is finished. It may be determined that the predetermined condition is satisfied in a case where the number of times of ejection of each ink color has reached a predetermined number or more, or in a case where the number of times of ejection of a specific ink color has reached a predetermined number or more. Alternatively, the processing illustrated in FIG. 14 may be executed in a case where a predetermined period has elapsed after the processing illustrated in FIG. 7 or the previous processing illustrated in FIG. 14 is finished, or in a case where a predetermined number of sheets are printed. A case where ink droplets are ejected a predetermined number of times after the processing illustrated in FIG. 7 is finished will be described below. In a case where it is determined that the predetermined condition is satisfied (YES in step S701), the processing proceeds to step S702. In a case where it is determined that the predetermined condition is not satisfied (NO in step S701), the processing illustrated in FIG. 14 is terminated.

Figure 15:
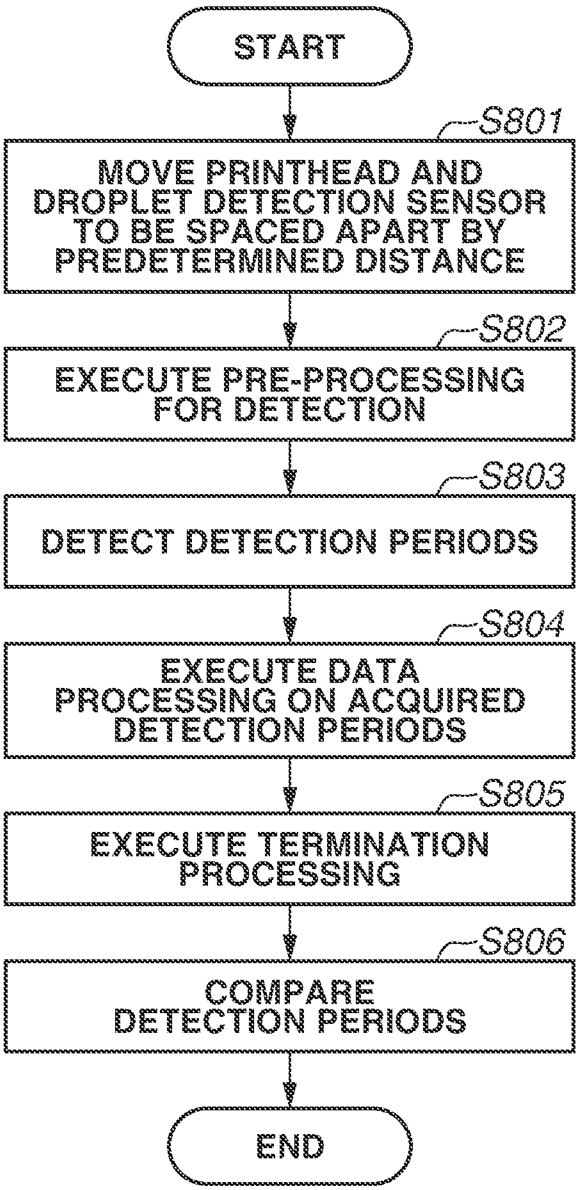
FIG. 15 is a flowchart illustrating ejection speed comparison processing according to the fourth exemplary embodiment.

Next, in step S702, processing illustrated in FIG. 15 is executed. The processing illustrated in FIG. 15 is processing for detecting and comparing the detection periods of when the distance between the ejection port surface 201*a* and the droplet detection sensor 205 corresponds to a predetermined distance. The processing illustrated in FIG. 15 will be described below.

In step S801, the lift motor 211 is driven to move the ejection port surface 201*a* of the printhead 201 and the droplet detection sensor 205 to be spaced apart from each other by a predetermined distance. In this case, the predetermined distance corresponds to the distance H3 illustrated in FIG. 5C. Any distance may be used as long as the detection period and ejection speed information corresponding to the distance are stored in the memory 303.

Next, in step S802, pre-processing for detecting the detection period is executed. Processing of this step is similar to the processing of step S602 illustrated in FIG. 7.

In step S803, an ejection operation for ejecting ink droplets for inspection from the printhead 201 to the light 404 emitted from the light-emitting element 401 of the droplet detection sensor 205 is executed. Then, a detection period from when the ejection of an ink droplet from a predetermined nozzle of the printhead 201 is started until when the light-receiving element 402 of the droplet detection sensor 205 detects that the ink droplet has passed through the light 404 is detected.

In step S804, data processing is executed on the detection period acquired in step S803, and the detection period corresponding to the distance set in step S801 is calculated. Processing of this step is similar to processing of step S604 illustrated in FIG. 7.

In step S805, termination processing is executed. The termination processing is processing similar to step S608 illustrated in FIG. 7.

In step S806, the previously acquired detection period, i.e., the detection period acquired in step S604 illustrated in FIG. 7 is compared with the detection period acquired in step S804. Specifically, the difference between the two detection periods is calculated. In a case where the previous processing does not correspond to the processing illustrated in FIG. 7, but corresponds to the processing illustrated in FIG. 14, the difference between the previous detection period acquired in step S804 illustrated in FIG. 14 and the current detection period acquired in step S804 illustrated in FIG. 14 is calculated.

After completion of the above-described processing, the processing of step S702 illustrated in FIG. 14 is terminated and then the processing proceeds to step S703. In step S703, determination of whether the difference calculated in step S806 is more than or equal to a predetermined value is performed. In a case where the difference is more than or equal to the predetermined value (YES in step S703), the processing proceeds to step S704. In a case where the difference is not more than or equal to the predetermined value (NO in step S703), the processing illustrated in FIG. 14 is terminated.

In step S704, processing similar to the ejection speed calculation processing illustrated in FIG. 7 is executed and the ejection speed information is updated. In this operation, the detection period corresponding to the distance H3 at which the detection period is already detected in step S803 is not necessarily performed.

In step S705, the number of updates indicating the number of updating the ejection speed information is incremented by "+1" and the number of updates is stored in the memory 303. The ejection speed information update processing illustrated in FIG. 14 is terminated as described above.

The predetermined condition used in step S701 and the predetermined value used in step S703 may be changed in accordance with the number of updating the ejection information that is updated in step S705. As the amount of ejected ink increases, the rate of decrease in the ejection speed with respect to the ejection amount decreases. For example, if the predetermined condition and the predetermined value that are set at first are continuously used, the difference that is more than or equal to the predetermined value in step S703 cannot be obtained and the frequency of ejection speed update processing decreases. A decrease in the frequency of update processing can be prevented by reducing the number of times set as the predetermined condition in step S701 and by reducing the predetermined value used in step S703.

Figure 16A:
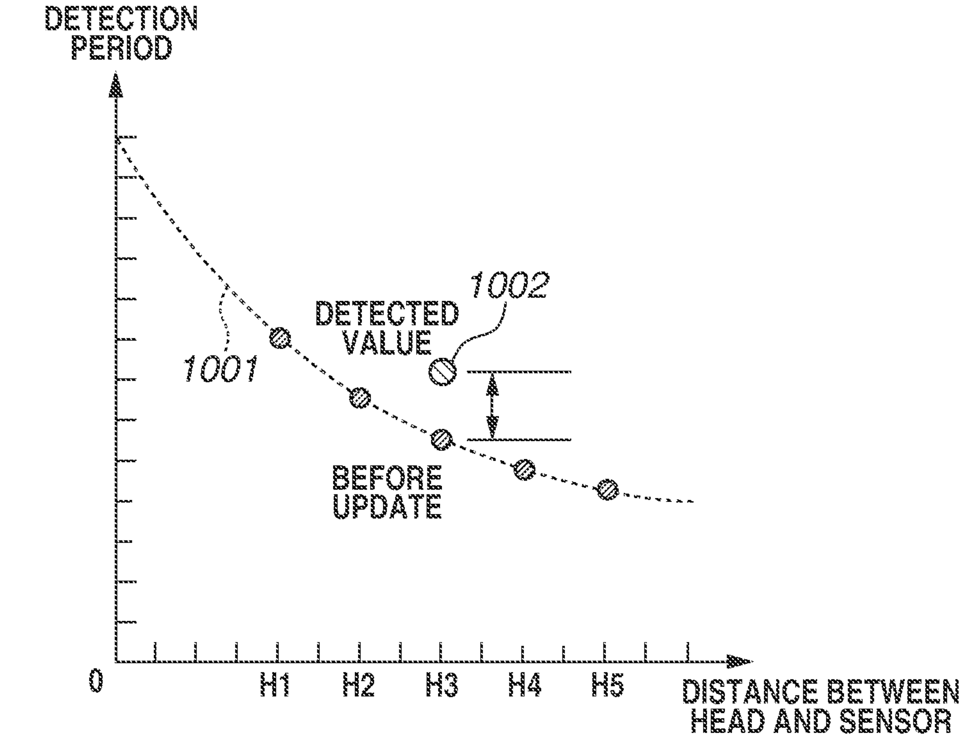
FIGS. 16A and 16B are graphs illustrating an ejection period and an ejection speed according to the fourth exemplary embodiment.
Figure 16B:
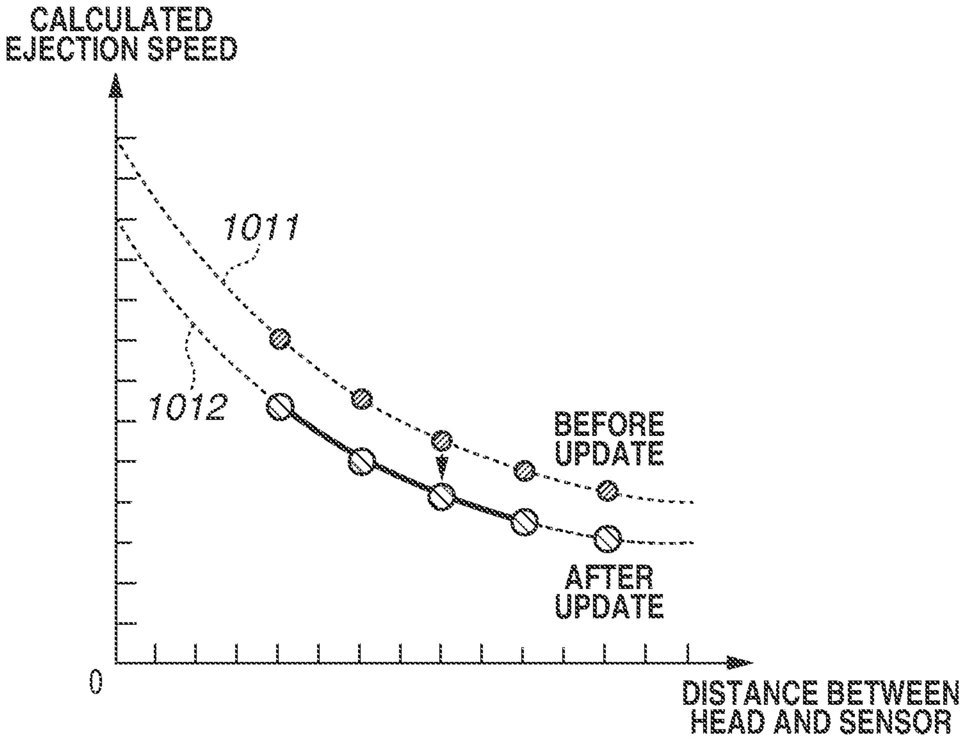

FIGS. 16A and 16B are graphs illustrating the detection period and the ejection speed. FIG. 16A is a graph illustrating the distance between the ejection port surface 201*a* and the light 404 of the droplet detection sensor 205 and the detection period at each distance. In FIG. 16A, the detection periods represented by hatched circles on a dotted line 1001 indicate the detection periods acquired in step S604 illustrated in FIG. 7 or in the previous processing in step S804 illustrated in FIG. 14. A hatched circle 1002 represents the current detection period acquired in step S804 illustrated in FIG. 14. The difference calculated in step S802 illustrated in FIG. 14 is the difference between the detection period corresponding to the distance H3 on the dotted line 1001 and the hatched circle 1002. In a case where this difference is more than or equal to a predetermined period, the detection periods corresponding to the distances H1 to H5, respectively, are detected and ejection speeds are calculated based on the detection periods.

FIG. 16B illustrates the calculated ejection speed. Hatched circles on a dotted line 1011 represent the ejection speeds calculated in step S604 illustrated in FIG. 7 or the ejection speeds calculated in the previous processing in step S704 illustrated in FIG. 14. Hatched circles on a dotted line 1012 represent the ejection speeds calculated in step S704 illustrated in FIG. 14.

As illustrated in FIG. 16A, in a case where the detection period increases, the ejection speed at each distance decreases as illustrated in FIG. 16B.

As described above, in the case of updating the ejection speed information, the detection period at a single distance is first measured and the measured detection period is compared with the previous detection period to determine whether there is a need to update the ejection speed information. Thus, determination of whether to update the ejection speed information is performed before the measurement of the detection period at all distances, and in a case where there is a need to update the ejection speed information, detection periods at a plurality of distances are detected and ejection speeds are calculated, whereby the ejection speed can be obtained with high accuracy. In a case where there is no need to update the ejection speed information, the time for update processing can be reduced.

FIG. 14 illustrates an example where the measured number of detection periods is increased and the calculated number of ejection speeds is decreased, but the measured number of detection periods may be decreased and the calculated number of ejection speeds may be increased. Also, in this case, the processing illustrated in FIG. 14 described above can be applied. It is also possible to perform the processing illustrated in FIG. 14 without performing the processing illustrated in FIG. 7. In this case, for example, update processing is performed at a timing of when the printhead 201 is mounted. Since the ejection speed information is not stored in the memory 303 in this state, comparison processing using an initial value "0" is performed.

While the detection period at a single distance (distance H3) is measured in step S702 described above, detection periods at a plurality of distances may be measured. However, the number of distances to be measured is less than or equal to all the distances (distances H1 to H5 in the present exemplary embodiment) that are used for ejection speed calculation processing. The measurement of detection periods at a plurality of distances makes it possible to reduce a detection error, and the ejection speed information update processing can be prevented from being executed accidentally due to a detection error even when there is no need to update the ejection speed information.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to an exemplary embodiment of the present invention, a period from when an ink droplet is ejected from an ejection head until when the ink droplet is detected by a droplet detection sensor is measured a plurality of times while changing a distance between the ejection head and the droplet detection sensor, whereby the accuracy of calculating the ejection speed of the ink droplet can be improved.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An ejection apparatus comprising:

an ejection head including a plurality of ejection ports and configured to eject a droplet from each of the plurality of ejection ports formed on an ejection port surface;

a droplet detection unit configured to detect that the ejected droplet has reached a predetermined position;

a change unit configured to change a distance between the ejection port surface of the ejection head and the droplet detection unit; and a determination unit configured to determine an ejection timing of the droplet of when an image is printed on a recording medium by the ejection head, by detecting the droplet ejected from each of the plurality of ejection ports by the droplet detection unit when the distance from the ejection port surface of the ejection head to the predetermined position is a first distance and detecting the droplet ejected from each of the plurality of ejection ports by the droplet detection unit when the distance from the ejection port surface of the ejection head to the predetermined position is a second distance, wherein the ejection head prints, in accordance with the timing determined by the determination unit by detecting the droplet by the droplet detection unit, a pattern for adjusting the ejection timing on the recording medium at a timing that is after the determination performed by the determination unit by detecting the droplet by the droplet detecting unit, and wherein the determination unit determines the ejection timing, based on the pattern and a result of the droplet detection by the droplet detection unit.

2. The ejection apparatus according to claim 1, wherein the determination unit determines the ejection timing of the droplet of when the image is printed on the recording medium by the ejection head, by detecting the droplet ejected from each of the plurality of ejection ports by the droplet detection unit when the distance from the ejection port surface of the ejection head to the predetermined position is the first distance, the result of detecting the droplet ejected from each of the plurality of ejection ports by the droplet detection unit when the distance from the ejection port surface of the ejection head to the predetermined position is the second distance, and a result of detecting the droplet ejected from each of the plurality of ejection ports by the droplet detection unit when the distance from the ejection port surface of the ejection head to the predetermined position is a third distance.

3. The ejection apparatus according to claim 1, further comprising a measurement unit configured to measure a distance between the ejection head and the recording medium.

4. The ejection apparatus according to claim 1, wherein the determination unit determines the ejection timing, based on a table indicating a relationship between an ejection speed and the ejection timing of the droplet.

5. The ejection apparatus according to claim 1, further comprising a period detection unit configured to detect a period from when the ejection head starts ejection of the droplet until when the droplet detection unit detects that the droplet has reached the predetermined position; and a calculation unit configured to calculate an ejection speed of the droplet, based on the period detected by the period detection unit and the distance from the ejection port surface to the predetermined position, wherein the ejection head prints a pattern for adjusting the ejection timing on the recording medium, wherein the calculation unit calculates the ejection speed of the droplet, based on the ejection timing determined based on the pattern, wherein the period detection unit detects a period from when the ejection head starts ejection of the droplet at a predetermined timing different from a timing of when the pattern is printed until when the droplet detection unit detects that the droplet has reached the predetermined position, wherein the calculation unit calculates the ejection speed, based on the period detected by the period detection unit, and wherein the determination unit determines the ejection timing, based on the ejection speed calculated by the calculation unit using the ejection timing determined based on the pattern and the ejection speed calculated using the period detected by the period detection unit.

6. The ejection apparatus according to claim 5, further comprising:

an ejection signal generation unit configured to generate an ejection signal; and a driving pulse generation unit configured to generate a driving pulse for causing a droplet to be ejected from each of the plurality of ejection ports of the ejection head in accordance with an input of the ejection signal, wherein the ejection head ejects the droplet from each of the plurality of ejection ports by the driving pulse applied to the ejection head, and wherein the period detection unit detects the period using a timing when the ejection signal generation unit inputs the ejection signal to the driving pulse generation unit as the timing when ejection of the droplet from the ejection port is started.

7. The ejection apparatus according to claim 1, wherein the ejection head prints the pattern when the ejection head is mounted on the ejection apparatus.

8. The ejection apparatus according to claim 1, wherein the predetermined timing is a timing when a predetermined time has elapsed from when the determination unit determines the ejection timing.

9. The ejection apparatus according to claim 1, wherein the predetermined timing is a timing when a predetermined number of droplets are ejected after the determination unit determines the ejection timing.

10. The ejection apparatus according to claim 1, further comprising:

a period detection unit configured to detect a period from when the ejection head starts ejection of the droplet until when the droplet detection unit detects that the droplet has reached the predetermined position;

a calculation unit configured to calculate an ejection speed of the droplet, based on the period detected by the period detection unit and the distance from the ejection port surface to the predetermined position; and a control unit configured to control the ejection head, based on the ejection speed of the droplet calculated by the calculation unit, wherein the period detection unit detects, at a predetermined timing after a first period and a second period are detected, in a state where the distance from the ejection port surface to the predetermined position corresponds to the first distance, a third period from when ejection of the droplet from the ejection port is started until when the droplet detection unit detects the droplet, wherein in a case where a difference between the first period and the third period is more than or equal to a predetermined period, the period detection unit further detects a fourth period from when ejection of the droplet from the ejection port at the second distance is started until when the droplet detection unit detects the droplet, wherein the calculation unit calculates the ejection speed of the droplet, based on the first distance, the second distance, the third period, and the fourth period, and the control unit controls an ejection operation of the ejection head, based on the ejection speed, and wherein in a case where the difference between the first period and the third period is not more than or equal to the predetermined period, the period detection unit does not detect the period from when ejection of the droplet from the ejection port at the second distance is started until when the droplet detection unit detects the droplet, and the control unit controls the ejection operation of the ejection head, based on the ejection speed already calculated by the calculation unit, based on the first distance, the second distance, the first period, and the second period.

11. The ejection apparatus according to claim 10, wherein a timing when the period detection unit detects the first period and the second period is a timing when the ejection head is mounted on the ejection apparatus.

12. The ejection apparatus according to claim 10, wherein the period detection unit detects, at a predetermined timing after the third period and the fourth period are detected, a fifth period from when ejection of the droplet from the ejection port is started in a state where the distance from the ejection port surface to the predetermined position corresponds to the first distance until when the droplet detection unit detects the droplet, wherein in a case where a difference between the third period and the fifth period is more than or equal to a predetermined period, the period detection unit detects a sixth period from when ejection of the droplet from the ejection port at the second distance is started until when the droplet detection unit detects the droplet, the calculation unit calculates the ejection speed of the droplet, based on the first distance, the second distance, the fifth period, and the sixth period, and the control unit controls the ejection operation of the ejection head, based on the ejection speed, and wherein in a case where the difference between the third period and the fifth period is not more than or equal to the predetermined period, the period detection unit does not detect the period from when ejection of the droplet from the ejection port at the second distance is started until when the droplet detection unit detects the droplet, and the control unit controls the ejection operation, based on the ejection speed of the droplet already calculated by the calculation unit based on the first distance, the second distance, the third period, and the fourth period.

13. The ejection apparatus according to claim 10, further comprising a storage unit configured to store information indicating an ejection speed, wherein the storage unit stores information indicating the ejection speed calculated by the calculation unit.

14. The ejection apparatus according to claim 10, further comprising:

a storage unit configured to store information indicating an ejection speed, wherein the storage unit stores information indicating the ejection speed calculated by the calculation unit, and wherein the predetermined period is changed in accordance with the number of updates of the information indicating the ejection speed stored in the storage unit.

15. The ejection apparatus according to claim 14, further comprising:

a determination unit configured to determine whether the predetermined timing is reached, wherein the determination unit changes a condition for determining that the predetermined timing is reached, in accordance with the number of updates of information indicating an ejection speed stored in the storage unit.

16. The ejection apparatus according to claim 1, further comprising:

a detection unit including a light-emitting unit configured to emit light and a light-receiving unit configured to receive the light emitted from the light-emitting unit, wherein the droplet detection unit detects that a droplet ejected from the ejection head reaches the light emitted from the light emitting unit, based on an amount of light received by the light-receiving unit, the light corresponding to the predetermined position.

17. An ejection apparatus comprising:

an ejection head configured to eject a droplet from an ejection port formed on an ejection port surface;

a platen configured to support a recording medium conveyed in a conveyance direction and located at a position facing the ejection head;

a droplet detection sensor provided next to the platen in a direction intersecting with the conveyance direction and configured to detect that the ejected droplet has reached a predetermined position;

a change unit configured to change a distance between the ejection port surface of the ejection head and the droplet detection sensor; and a determination unit configured to determine an ejection timing of the droplet of when an image is printed on the recording medium by the ejection head based on a result of detecting by the droplet detection sensor when the distance from the ejection port surface of the ejection head to the predetermined position is a first distance and a result of detecting by the droplet detection sensor when the distance from the ejection port surface of the ejection head to the predetermined position is a second distance, wherein the ejection head prints, in accordance with the timing determined by the determination unit by detecting the droplet by the droplet detection unit, a pattern for adjusting the ejection timing on the recording medium at a timing that is after the determination performed by the determination unit by detecting the droplet by the droplet detecting unit, and wherein the determination unit determines the ejection timing, based on the pattern and a result of the droplet detection by the droplet detection unit.

18. The ejection apparatus according to claim 17, further comprising a measurement unit configured to measure a distance between the ejection head and the recording medium.

19. The ejection apparatus according to claim 17, wherein the determination unit determines the ejection timing, based on a table indicating a relationship between an ejection speed and the ejection timing of the droplet.

20. The ejection apparatus according to claim 17, further comprising a period detection unit configured to detect a period from when the ejection head starts ejection of the droplet until when the droplet detection sensor detects that the droplet has reached the predetermined position; and a calculation unit configured to calculate an ejection speed of the droplet, based on the period detected by the period detection unit and the distance from the ejection port surface to the predetermined position, wherein the ejection head prints the pattern for adjusting the ejection timing on the recording medium, wherein the calculation unit calculates the ejection speed of the droplet, based on the ejection timing determined based on the pattern, wherein the period detection unit detects a period from when the ejection head starts ejection of the droplet at a predetermined timing different from a timing of when the pattern is printed until when the droplet detection sensor detects that the droplet has reached the predetermined position, wherein the calculation unit calculates the ejection speed, based on the period detected by the period detection unit, and wherein the determination unit determines the ejection timing, based on the ejection speed calculated by the calculation unit using the ejection timing determined based on the pattern and the ejection speed calculated using the period detected by the period detection unit.

21. The ejection apparatus according to claim 17, wherein the ejection head prints the pattern when the ejection head is mounted on the ejection apparatus.

22. A droplet ejection speed calculation method comprising:

detecting that a droplet ejected from an ejection port formed on an ejection port surface of an ejection head which has a plurality of ejection ports has reached a predetermined position;

changing a distance from the ejection head to the predetermined position to a second distance different from a first distance;

determining an ejection timing of the droplet of when an image is printed on a recording medium by the ejection head based on by detecting a droplet ejected from each of the plurality of ejection ports when the distance from the ejection port surface of the ejection head to the predetermined position is a first distance and by detecting the droplet ejected from each of the plurality of ejection ports when the distance from the ejection port surface of the ejection head to the predetermined position is a second distance;

printing, by the ejection head, in accordance with the timing determined by the determination unit by detecting the droplet by the droplet detection unit, a pattern for adjusting the ejection timing on the recording medium at a timing that is after the determination performed by the determination unit by detecting the droplet by the droplet detection unit; and determining the ejection timing, based on the pattern and a result of the droplet detection by the droplet detection unit.

23. A droplet ejection speed calculation method comprising:

printing an image by an ejection head which has a plurality of ejection ports and is located at a position facing a platen configured to support a recording medium conveyed in a conveyance direction;

detecting that a droplet ejected from each of the plurality of ejection ports formed on an ejection port surface of the ejection head has reached a predetermined position by a droplet detection sensor provided next to the platen in a direction intersecting with the conveyance direction;

changing a distance from the ejection head to the predetermined position to a second distance different from a first distance, determining an ejection timing of the droplet of when an image is printed on the recording medium by the ejection head, by detecting the droplet ejected from each of the plurality of ejection ports by the droplet detection sensor when the distance from the ejection port surface of the ejection head to the predetermined position is a first distance and detecting the droplet ejected from each of the plurality of ejection ports by the droplet detection sensor when the distance from the ejection port surface of the ejection head to the predetermined position is a second distance;

printing, by the ejection head, in accordance with the timing determined by the determination unit by detecting the droplet by the droplet detection unit, a pattern for adjusting the ejection timing on the recording medium at a timing that is after the determination performed by the determination unit by detecting the droplet by the droplet detection unit; and determining the ejection timing, based on the pattern and a result of the droplet detection by the droplet detection unit.

* * * * *